United States Patent
Yamamoto et al.

(10) Patent No.: US 7,428,584 B2
(45) Date of Patent: Sep. 23, 2008

(54) METHOD FOR MANAGING A NETWORK INCLUDING A STORAGE SYSTEM

(75) Inventors: Masayuki Yamamoto, Sagamihara (JP); Takashi Oeda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 758 days.

(21) Appl. No.: 10/355,899

(22) Filed: Jan. 31, 2003

(65) Prior Publication Data

US 2004/0068561 A1    Apr. 8, 2004

(30) Foreign Application Priority Data

Oct. 7, 2002    (JP)    ............... 2002-293150

(51) Int. Cl.
 G06F 15/173    (2006.01)
 G06F 15/177    (2006.01)
 G06F 11/00    (2006.01)
 G06F 12/00    (2006.01)

(52) U.S. Cl. .................. 709/223; 715/736; 715/737; 711/111; 714/6

(58) Field of Classification Search ................ 709/219, 709/223–226; 707/100; 711/203, 112, 111, 711/114; 714/4–8, 42; 715/734, 736–738, 715/743–747
See application file for complete search history.

(56) References Cited

U.S. PATENT DOCUMENTS

| | | | |
|---|---|---|---|
| 6,253,240 B1 | 6/2001 | Axberg et al. | |
| 6,457,139 B1 | 9/2002 | D'Errico et al. | |
| 6,671,776 B1 * | 12/2003 | DeKoning | ................ 711/114 |
| 6,697,924 B2 | 2/2004 | Swank | |
| 6,854,035 B2 | 2/2005 | Dunham et al. | |
| 6,889,345 B2 * | 5/2005 | Sicola et al. | ................ 714/43 |
| 6,892,264 B2 | 5/2005 | Lamb | |
| 6,920,494 B2 | 7/2005 | Heitman et al. | |

(Continued)

FOREIGN PATENT DOCUMENTS

EP    1115225 A2    7/2001

(Continued)

OTHER PUBLICATIONS

"Scalar i2000 The Next-Generation Data Center Library," product information Advanced Digital Information Corporation Redmond, WA (2003).

(Continued)

Primary Examiner—Ario Etienne
Assistant Examiner—Gregory G Todd
(74) Attorney, Agent, or Firm—Mattingly, Stanger, Malur & Brundidge, P.C.

(57) ABSTRACT

A SAN manager acquires information which each unit manages from a management agent of each unit connected to a SAN, detects virtual volume mapping and real volume mapping in the SAN based upon the acquired information and manages them. A SAN management server holds an event translation dictionary for translating contents of a failure notification message received from each unit in the SAN and detects an effect which failure has upon I/O access of a virtual volume if a failure notification message is received. Further, a function for checking a request for generating a virtual volume from a SAN administrator based upon virtual volume mapping information and real volume mapping information is realized.

14 Claims, 25 Drawing Sheets

U.S. PATENT DOCUMENTS

| | | |
|---|---|---|
| 6,952,698 B2 | 10/2005 | Delaire et al. |
| 7,072,986 B2 * | 7/2006 | Kitamura et al. ............ 709/249 |
| 7,275,064 B2 * | 9/2007 | Hirao ......................... 707/102 |
| 7,287,116 B2 * | 10/2007 | Iwami et al. .................... 711/6 |
| 2001/0047482 A1 | 11/2001 | Harris et al. |
| 2001/0054093 A1 | 12/2001 | Iwatani |
| 2002/0103889 A1 * | 8/2002 | Markson et al. ............. 709/223 |
| 2003/0051021 A1 * | 3/2003 | Hirschfeld et al. .......... 709/223 |
| 2003/0093509 A1 | 5/2003 | Li et al. |
| 2003/0093567 A1 | 5/2003 | Lolayekar et al. |
| 2003/0126518 A1 | 7/2003 | Binger |
| 2003/0145041 A1 | 7/2003 | Dunham et al. |
| 2003/0146929 A1 | 8/2003 | Baldwin et al. |
| 2003/0149695 A1 | 8/2003 | Delaire et al. |
| 2003/0149752 A1 | 8/2003 | Baldwin et al. |
| 2003/0149753 A1 | 8/2003 | Lamb |
| 2003/0149761 A1 | 8/2003 | Baldwin et al. |
| 2003/0149762 A1 * | 8/2003 | Knight et al. ................ 709/224 |
| 2003/0149763 A1 | 8/2003 | Heltman et al. |
| 2003/0149769 A1 | 8/2003 | Axberg et al. |
| 2003/0149770 A1 | 8/2003 | Delaire et al. |
| 2003/0149795 A1 | 8/2003 | Lamb et al. |
| 2003/0154267 A1 | 8/2003 | Camacho et al. |
| 2003/0154271 A1 | 8/2003 | Baldwin et al. |
| 2003/0167327 A1 * | 9/2003 | Baldwin et al. ............. 709/225 |
| 2003/0172149 A1 * | 9/2003 | Edsall et al. ................ 709/224 |
| 2003/0172239 A1 | 9/2003 | Swank |
| 2003/0177168 A1 | 9/2003 | Heitman et al. |
| 2003/0179227 A1 | 9/2003 | Ahmad et al. |
| 2003/0182422 A1 | 9/2003 | Bradshaw et al. |
| 2003/0191904 A1 | 10/2003 | Iwami et al. |
| 2003/0204597 A1 | 10/2003 | Arakawa et al. |
| 2003/0208589 A1 | 11/2003 | Yamamoto |
| 2003/0229645 A1 | 12/2003 | Mogi et al. |
| 2004/0028043 A1 * | 2/2004 | Maveli et al. ............... 370/392 |
| 2004/0030822 A1 * | 2/2004 | Rajan et al. ..................... 711/4 |
| 2004/0049572 A1 | 3/2004 | Yamamoto et al. |
| 2004/0054648 A1 * | 3/2004 | Mogi et al. ..................... 707/1 |
| 2004/0061701 A1 | 4/2004 | Arquie et al. |
| 2004/0064545 A1 * | 4/2004 | Miyake ...................... 709/224 |
| 2004/0078647 A1 * | 4/2004 | Das Sharma et al. ........... 714/7 |
| 2004/0103244 A1 | 5/2004 | Fujimoto et al. |
| 2004/0221105 A1 | 11/2004 | Fujimoto et al. |
| 2005/0055428 A1 | 3/2005 | Terai et al. |

FOREIGN PATENT DOCUMENTS

| | | | |
|---|---|---|---|
| EP | 1115225 A3 | | 7/2001 |
| GB | 2351375 A | | 12/2000 |
| GB | 2351375 A | | 12/2000 |
| JP | 2001-143367 A | | 5/2001 |
| JP | 2001-249856 | | 9/2001 |

OTHER PUBLICATIONS

Barker et al. "Managing SANs," in *Storage Area Networking Essentials: A Complete Guide to Understanding & Implementing SANs*, chapter 12, pp. 331-335, John Wiley& Sons, Inc. NY (2002).

"Storage Management Solution in the SAN Environment", Fujitsu, No. 52, Mar. 10, 2001, pp. 118-122. (with English translation).

Open Report, "Four Weaknesses of SAN and Merits of Complementary Products", Nikkei Open Systems, No. 108, Mar. 15, 2002, pp. 108-111. (with English translation).

Advanced Technology, "Tracking Problems with Solutions Begin", Nikkei Computer, No. 508, Nov. 6, 2000, pp. 60-66. (With English translation).

Murakami, M. et al, "'Storeplaza' Storage Solutions to Support a Digital Economy", Hitachi-Hyoron, No. 83, May 1, 2001, pp. 15-18. (with English translation).

Vanel, L. et al, "AIX Logical Volume Manager, from A to Z: Introduction and Concepts", IBM, International Technical Support Organization, SG24-5432-00, pp. i-ii, 39, 40-42, 74, 124, Jan. 2000.

Hirao, T. et al, "Resource Management", Fujitsu Sci. Tech. J., vol. 40, Jun. 2004, pp. 123-132.

* cited by examiner

FIG. 6

| 13201 REAL MAPPING ID | SERVER 13202 | | | 13205 SWITCH NAME | 13206 SWITCH DATA INTERFACE ID | STORAGE 13207 | | | 13210 STORAGE DATA INTERFACE ID | 13211 VOLUME ID | 13212 CORRES- PONDING VIRTUAL MAPPING ID |
|---|---|---|---|---|---|---|---|---|---|---|---|
| | 13202 SERVER NAME | 13203 LU ID | 13204 SERVER DATA INTERFACE ID | | | SWITCH NAME | 13208 SWITCH DATA INTERFACE ID | 13209 STORAGE NAME | | | |
| pm1 | SERVER A | LU1 | a1 | SWITCH A | s1 | SWITCH A | s3 | STORAGE A | c1 | va1 | vm1 |
| pm2 | SERVER A | LU2 | a1 | SWITCH A | s1 | SWITCH A | s4 | STORAGE A | c2 | va2 | vm2 |
| pm3 | SERVER A | LU2 | a1 | SWITCH A | s1 | SWITCH A | s5 | STORAGE B | d1 | vb1 | vm2 |
| pm4 | SERVER B | LU1 | b1 | SWITCH A | s2 | SWITCH A | s6 | STORAGE B | d2 | vb2 | vm3 |

| VIRTUAL MAPPING ID | SERVER | | | | | | STORAGE | | | |
|---|---|---|---|---|---|---|---|---|---|---|
| | SERVER NAME | LU ID | SERVER DATA INTERFACE ID | SWITCH NAME | SWITCH DATA INTERFACE ID | SWITCH DATA INTERFACE ID | SWITCH NAME | SWITCH DATA INTERFACE ID | STORAGE NAME | STORAGE DATA INTERFACE ID | VOLUME ID |
| vm1 | SERVER A | LU1 | a1 | SWITCH A | s1 | s3 | SWITCH A | c1 | STORAGE A | va1 |
| vm2 | SERVER A | LU2 | a1 | SWITCH A | s1 | s1 | SWITCH A | vs1 | SWITCH A | w1 |
| vm3 | SERVER B | LU1 | b1 | SWITCH A | s2 | s2 | SWITCH A | vs2 | SWITCH A | w2 |

| DISCOVERY ID | DEVICE TYPE | DEVICE INFORMATION | IP ADDRESS | VOLUME VIRTUALIZATION FUNCTION |
|---|---|---|---|---|
| 1 | SERVER | VENDOR A, SERVER A | 100.100.100.100 | UNPROVIDED |
| 2 | SERVER | VENDOR B, SERVER B | 100.100.100.101 | UNPROVIDED |
| 3 | SWITCH | VENDOR C, SWITCH A | 100.100.100.102 | PROVIDED |
| 4 | STORAGE | VENDOR D, STORAGE A | 100.100.100.103 | UNPROVIDED |
| 5 | STORAGE | VENDOR E, STORAGE B | 100.100.100.104 | UNPROVIDED |

FIG. 9A
23200

| DATA INTERFACE ID | PORT WWN | SCSI ID |
|---|---|---|
| a1 | WWNa1 | 2 |

FIG. 9B
23200

| DATA INTERFACE ID | PORT WWN | SCSI ID |
|---|---|---|
| b1 | WWNb1 | 3 |

FIG. 10A
23300

| LU ID | DATA INTERFACE ID | SCSI ID | LUN | LU INFORMATION |
|---|---|---|---|---|
| LU1 | a1 | 2 | 1 | VENDOR D, STORAGE A, va1 |
| LU2 | a1 | 2 | 2 | VENDOR C, SWITCH A, vv1 |

FIG. 10B
23300

| LU ID | DATA INTERFACE ID | SCSI ID | LUN | LU INFORMATION |
|---|---|---|---|---|
| LU1 | b1 | 3 | 1 | VENDOR C, SWITCH A, vv2 |

| DATA INTERFACE ID | PORT WWN (SWITCH) | PORT WWN (CONNECTED DEVICE) |
|---|---|---|
| s1 | WWNs1 | WWNa1 |
| s2 | WWNs2 | WWNb1 |
| s3 | WWNs3 | WWNc1 |
| s4 | WWNs4 | WWNc2 |
| s5 | WWNs5 | WWNd1 |
| s6 | WWNs6 | WWNd2 |

| DATA INTERFACE ID | VIRTUAL DATA INTERFACE ID | SCSI ID |
|---|---|---|
| s1 | vs1 | 2 |
| s2 | vs2 | 3 |

| VIRTUAL VOLUME | | | | REAL VOLUME | | | |
|---|---|---|---|---|---|---|---|
| VIRTUAL DATA INTERFACE ID | SCSI ID | LUN | VIRTUAL VOLUME ID | REAL DATA INTERFACE ID | SCSI ID | LUN | REAL VOLUME INFORMATION |
| vs1 | 2 | 1 | vv1 | s4 | 3 | 1 | STORAGE A, va2, 2GB |
| vs1 | 2 | 1 | vv1 | s5 | 4 | 1 | STORAGE B, vb1, 4GB |
| vs2 | 3 | 1 | vv2 | s6 | 5 | 1 | STORAGE B, vb2, 10GB |
| — | — | — | — | s4 | 3 | 2 | STORAGE A, va3, 10GB |
| — | — | — | — | s4 | 3 | 3 | STORAGE A, va4, 8GB |
| — | — | — | — | s5 | 4 | 2 | STORAGE B, vb3, 6GB |

| DATA INTERFACE ID | PORT WWN |
|---|---|
| c1 | WWNc1 |
| c2 | WWNc2 |

| DATA INTERFACE ID | PORT WWN |
|---|---|
| d1 | WWNd1 |
| d2 | WWNd2 |

| REAL VOLUME ID | WHETHER PATH IS DEFINED OR NOT | DATA INTERFACE ID | SCSI ID | SCSI LUN |
|---|---|---|---|---|
| va1 | DEFINED | c1 | 2 | 1 |
| va2 | DEFINED | c2 | 3 | 1 |
| va3 | DEFINED | c2 | 3 | 2 |
| va4 | DEFINED | c2 | 3 | 3 |

| REAL VOLUME ID | WHETHER PATH IS DEFINED OR NOT | DATA INTERFACE ID | SCSI ID | SCSI LUN |
|---|---|---|---|---|
| vb1 | DEFINED | d1 | 4 | 1 |
| vb2 | DEFINED | d2 | 5 | 1 |
| vb3 | DEFINED | d2 | 5 | 2 |
| vb4 | UNDEFINED | — | — | — |

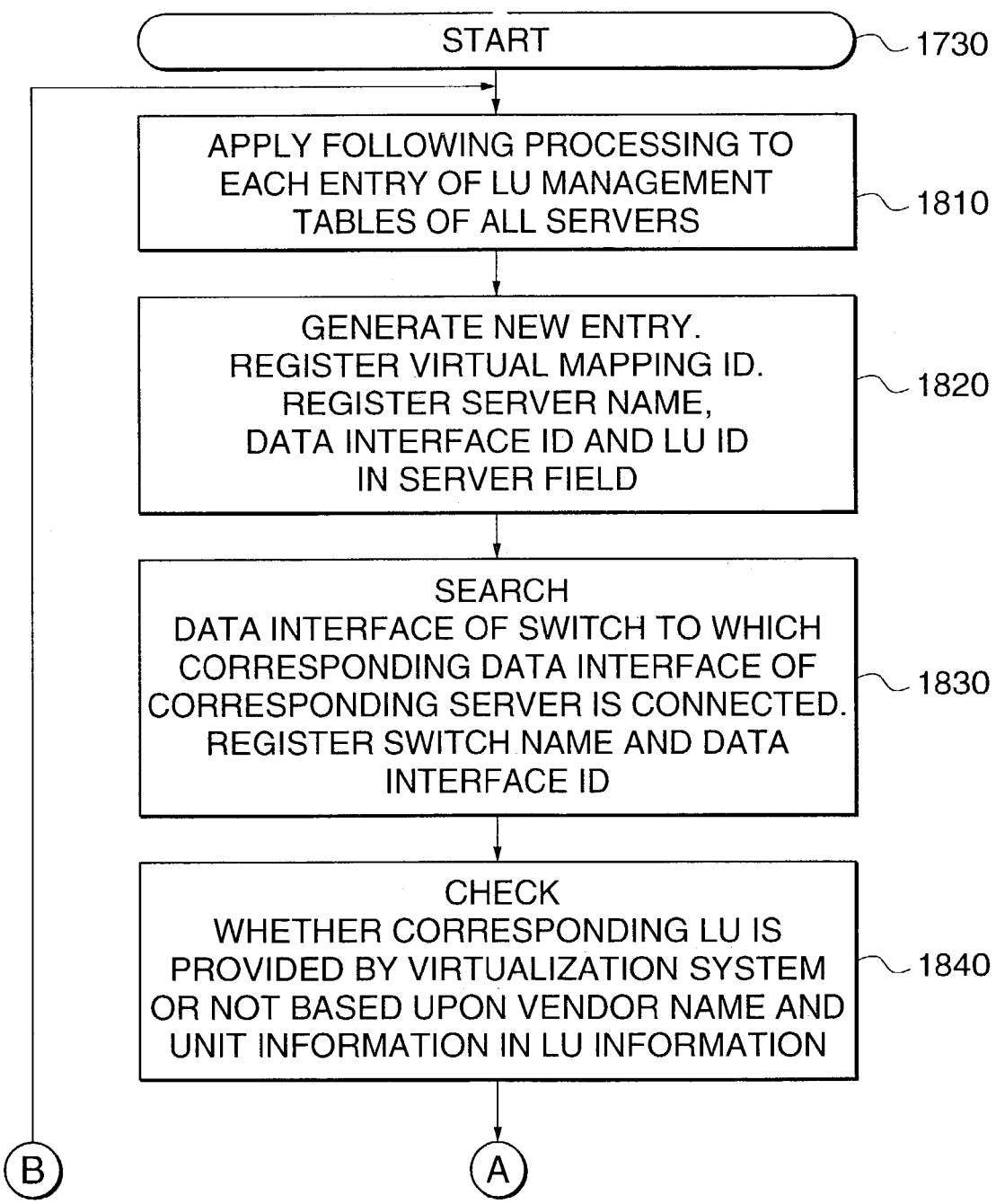

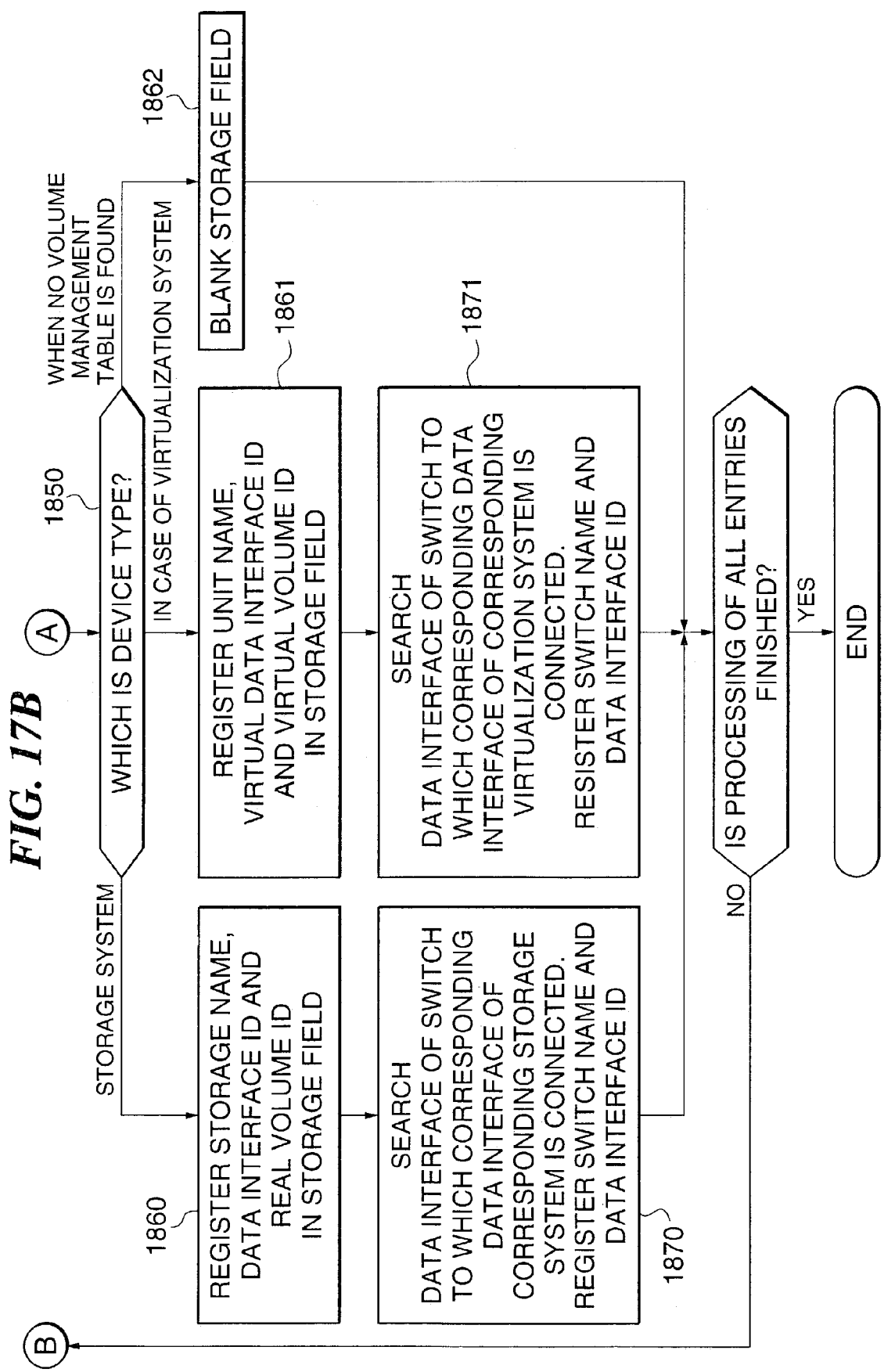

| FAILURE CODE | FAILURE COMPONENT | COMPONENT ID |
|---|---|---|
| 30c1 | DATA INTERFACE | c1 |
| 30c2 | DATA INTERFACE | c2 |
| ..... | ..... | ..... |

| EVENT ID | FAILURE DEVICE | FAILURE COMPONENT | REAL VOLUME | VIRTUAL VOLUME |
|---|---|---|---|---|
| 1000 | STORAGE A | DATA INTERFACE (c2) | pm2, pm3 | vm2 |

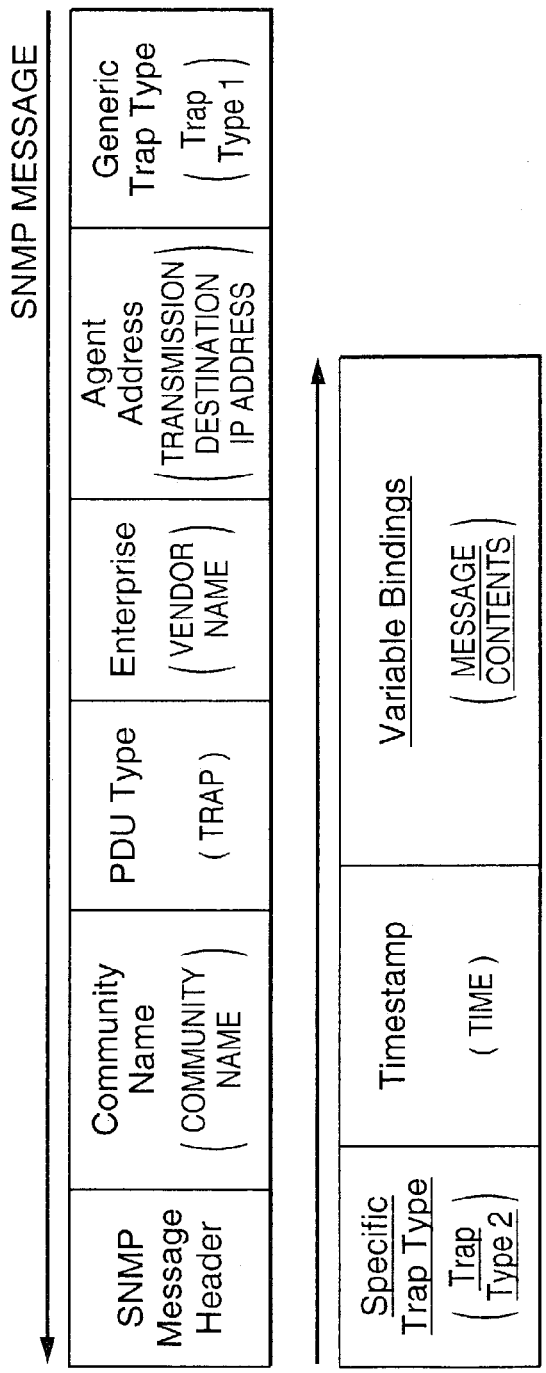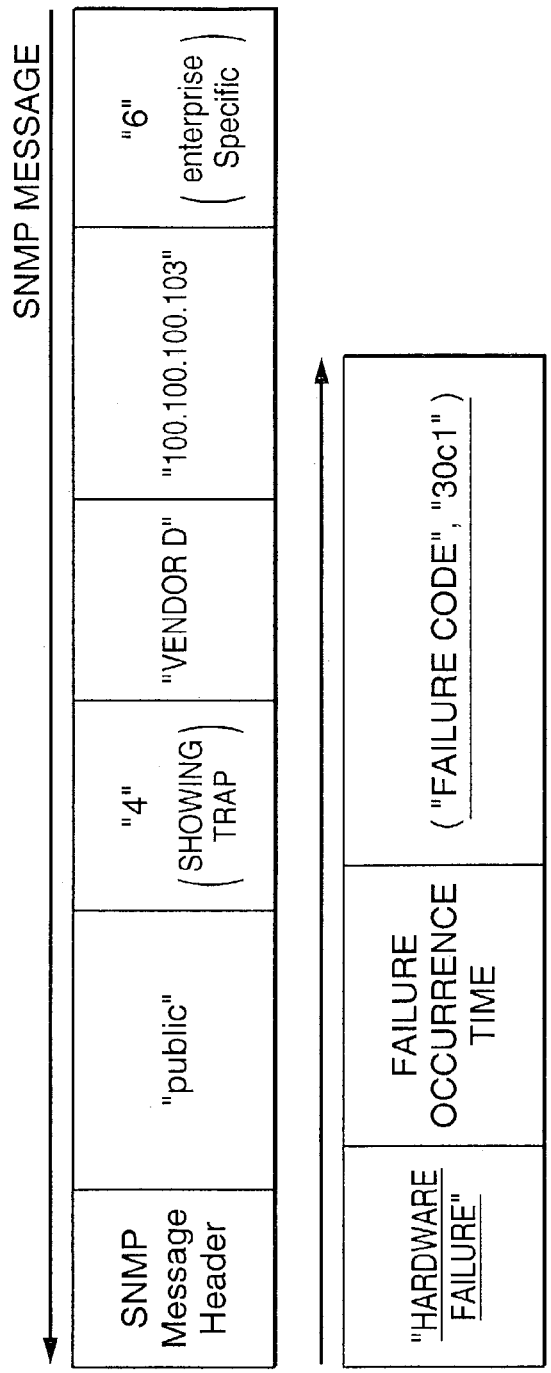
FIG. 26A
FIG. 26B

METHOD FOR MANAGING A NETWORK INCLUDING A STORAGE SYSTEM

BACKGROUND OF THE INVENTION

1. Field of the Invention

The present invention relates to a storage system used for a computer system. Particularly, the invention relates to a method of managing the configuration of a volume and failure and a system for management in a storage area network (hereinafter called SAN) in which a real volume provided from a storage system is provided to a server as a virtual volume via a volume virtualizing function of a virtualization system.

2. Description of the Prior Art (1) Regarding SAN

SAN is a dedicated network to input/output to/from a storage system. By introducing the SAN, we can realize highly scalable and available storage systems which provides high speed data transfer, and we can use the storage resources effectively, so in recent years the SAN is widely spreading.

(2) SAN Manager

To operate different types of storage systems consolidated into a SAN without a disruption, an administrator acquainted with the operation of each type is required, and the management cost is high. In SAN management, it is particularly important to monitor the availability which is the base of daily operation of each unit (a server, a switch and a storage system) connected to the SAN. Software for monitoring availability is hereinafter called a SAN manager. The SAN manager has two major functions of a configuration management function and a failure monitoring function. The configuration management function is a function for periodically discovering units composing the SAN and acquiring information from a management agent existing in each unit composing the SAN, detecting physical topology in the SAN from the acquired information, always visualizing the latest topology and providing it to a SAN manager user, in other words, a SAN administrator. The failure monitoring function is a function for receiving event notification such as hardware failure and the lowering of the performance issued by each unit and the occurrence of an event such as failure and the lowering of performance based upon unit information periodically acquired from a management agent existing in each unit and notifying the user of the event. The user can manage the availability of a unit from a single console using the SAN manager by these two functions and reduce costs for operation such as the reduction of SAN administrators.

(3) Virtualization System

The storage virtualization technology is one of the storage management techniques in the SAN. The storage virtualization technology is disclosed in U.K. Patent Application No. 2351375. The U.K. Patent Application No. 2351375 discloses that a device called a storage server is provided with the following two functions. 1) A function that discovers and manages multiple volumes which storage systems connected to the storage server provides and generates a storage pool. 2) A function that generates a virtual volume based upon one or more real volumes in the storage pool, and responds I/O access from the server to the virtual volume. A server or a switch provided with these two functions is hereinafter called a virtualization system. A user of the server has only to request a virtualization system to allocate a virtual volume by installing the virtualization system in a SAN and is not required to be conscious of the physical arrangement of storage systems connected to the virtualization system. As a result, a SAN administrator can unifically allocate volumes to servers.

SUMMARY OF THE INVENTION

As a virtualization system provides a virtual volume. A SAN administrator can make the flexible configuration of volumes provided to a server. However, a SAN administrator is required to always grasp both the relation between a server and a virtual volume and the relation between the virtual volume and real volumes in order to operate a SAN. The larger the scale of the SAN is, that is, the larger the number of virtualization systems and storage systems is and the more complex topology becomes, the more difficult it becomes to grasp the configuration of the SAN.

The object of the invention is to provide technique for easily grasping correspondence between real volumes and a virtual volume in the SAN.

Another object of the invention is to provide a method of relating and displaying a real volume and a virtual volume in the SAN.

Yet another object of the invention is to provide a method of detecting an effect of a virtual volume upon access and displaying it if a failure notification message is received from each unit in the SAN.

Yet further another object of the invention is to provide a method of checking whether a virtual volume which a SAN administrator intends to generate is already allocated in the SAN or not and notifying the SAN administrator of the result.

The further another object of the invention is to provide a computer program product that relates the connection information of each unit, the real volume information of storage systems and the virtual volume information of a virtualization system in the SAN and outputting them to an output device.

In the invention, a volume configuration in the SAN is managed using a management agent provided to each unit composing the SAN and a SAN manager provided to a SAN management server which a SAN administrator uses.

The SAN manager acquires information related to a data interface and a volume from a management agent provided to each server, acquires information related to a configuration of the connection of a data interface from a management agent provided to each switch, acquires information related to a data interface and a volume from a management agent provided to each storage system and acquires information related to a virtual volume from a management agent provided to each virtualization system. The SAN manager detects correspondence (hereinafter called a virtual volume mapping) between a server in the SAN and a virtual volume, and manages the correspondence as virtual volume mapping information based upon the acquired information. Further, the SAN manager detects correspondence (hereinafter called real volume mapping) between the server and a real volume based upon the virtual volume mapping and virtual volume configuration information and manages the correspondence as real volume mapping information. The SAN manager outputs the virtual volume mapping information and the real volume mapping information, and presents correspondence between both to a SAN administrator.

BRIEF DESCRIPTION OF THE DRAWINGS

FIG. 6 shows an example of a real volume mapping management table held by the SAN management server;

FIG. 7 shows an example of a virtual volume mapping management table held by the SAN management server;

FIG. 8 shows an example of a unit detection list held by the SAN management server;

FIG. 9 show examples of a data interface management table held by the server;

FIG. 10 show examples of a volume management table held by the server;

FIG. 11 shows an example of an FC connection management table held by the virtualization system;

FIG. 12 shows an example of a data interface management table held by the virtualization system;

FIG. 13 shows an example of a virtual volume management table held by the virtualization system;

FIG. 14 shows examples of a data interface management table held by the storage system;

FIG. 15 show examples of a real volume management table held by the storage system;

FIG. 17 is a flowchart showing an example of the detailed processing contents of a step executed by the SAN management server for constructing the virtual volume mapping management table;

FIG. 21 shows an example of an event translation dictionary related to the storage system held by the SAN management server;

FIG. 22 shows an example of a failure log held by the SAN management server;

FIG. 26 show examples of the configuration of an SNMP trap message.

DETAILED DESCRIPTION OF PREFERRED EMBODIMENTS

Figure 1:
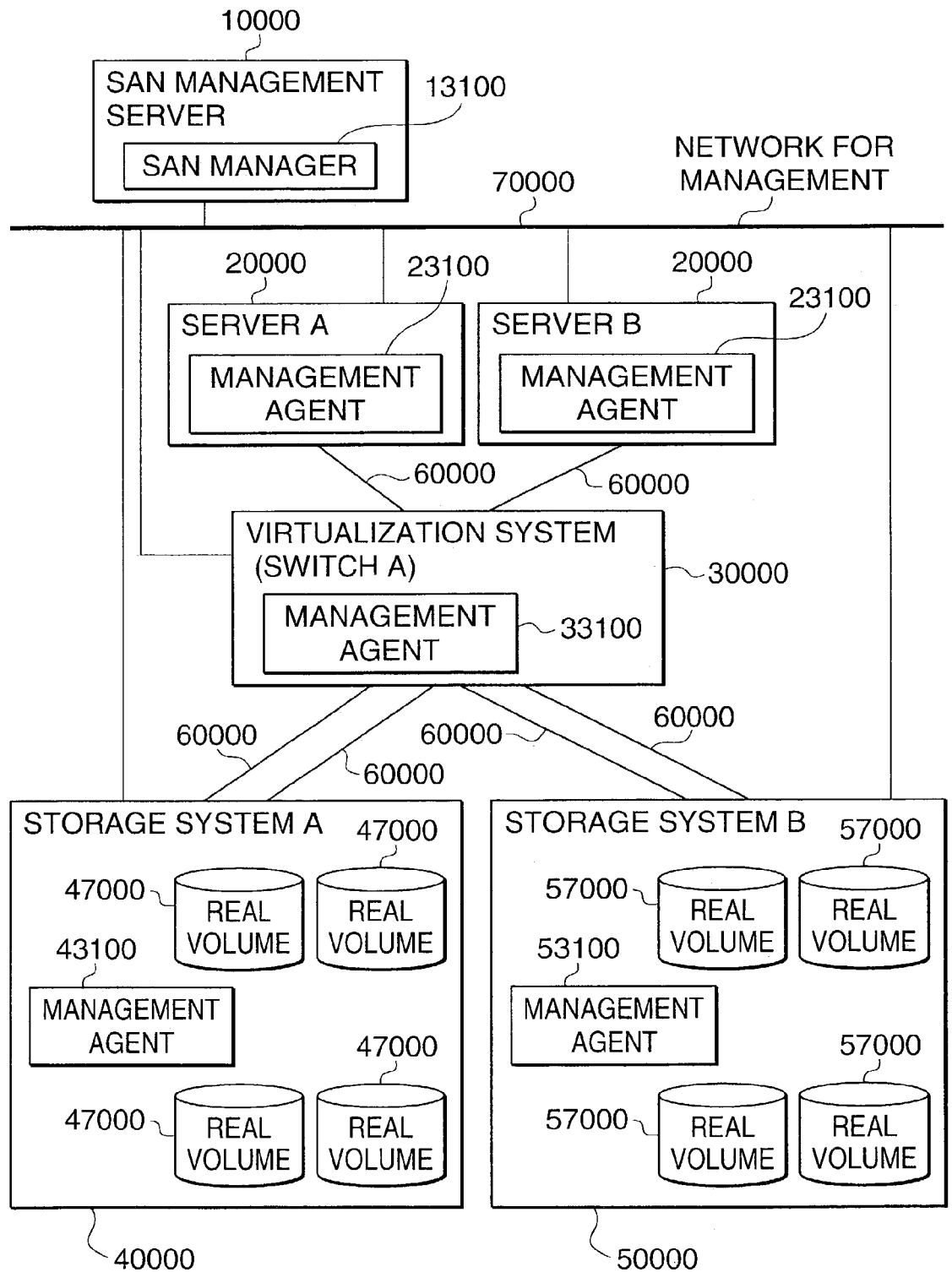
FIG. 1 shows an example of the configuration of a storage network system to which the invention is applied.

Referring to the drawings, embodiments of the invention will be described below. The invention is not limited to the following embodiments.

First Embodiment Configuration Management of Virtual Volume and Real Volume

This embodiment discloses a technique for managing the configuration of a virtual volume and a real volume by a SAN manager's grasping virtual volume mapping and real volume mapping.

(1-1) Example of SAN Configuration

First, an example of the configuration of a SAN will be described. FIGS. 1 to 5 show examples of the configuration of a SAN and each unit connected to the SAN and FIGS. 8 to 15 show management information which each unit provides.

FIG. 1 shows an example of the configuration of a SAN. The SAN in this embodiment has one or more servers with a management agent, one or more switches with a management agent, one or more virtualization systems with a management agent, one or more storage systems with a management agent and one SAN management server with a SAN manager. For convenience of the following explanation, in the SAN in the first embodiment, two servers (a server A and a server B) 20000, one virtualization system 30000 also functioning as a switch and two storage systems (a storage system A 40000 and a storage system B 50000) (hereinafter called a storage A 40000 and a storage B 50000) are mutually connected via Fibre Channel 60000. A SAN management server 10000 is connected to the server 20000, the virtualization system 30000 and the storage systems 40000 and 50000 via a network for management 70000, and a management agent in each unit and a SAN manager 13100 in the SAN management server 10000 can communicate via the network for management 70000. The SAN manager 13100 manages the configuration of a virtual volume and a real volume in the SAN by processing described later.

Figure 2:
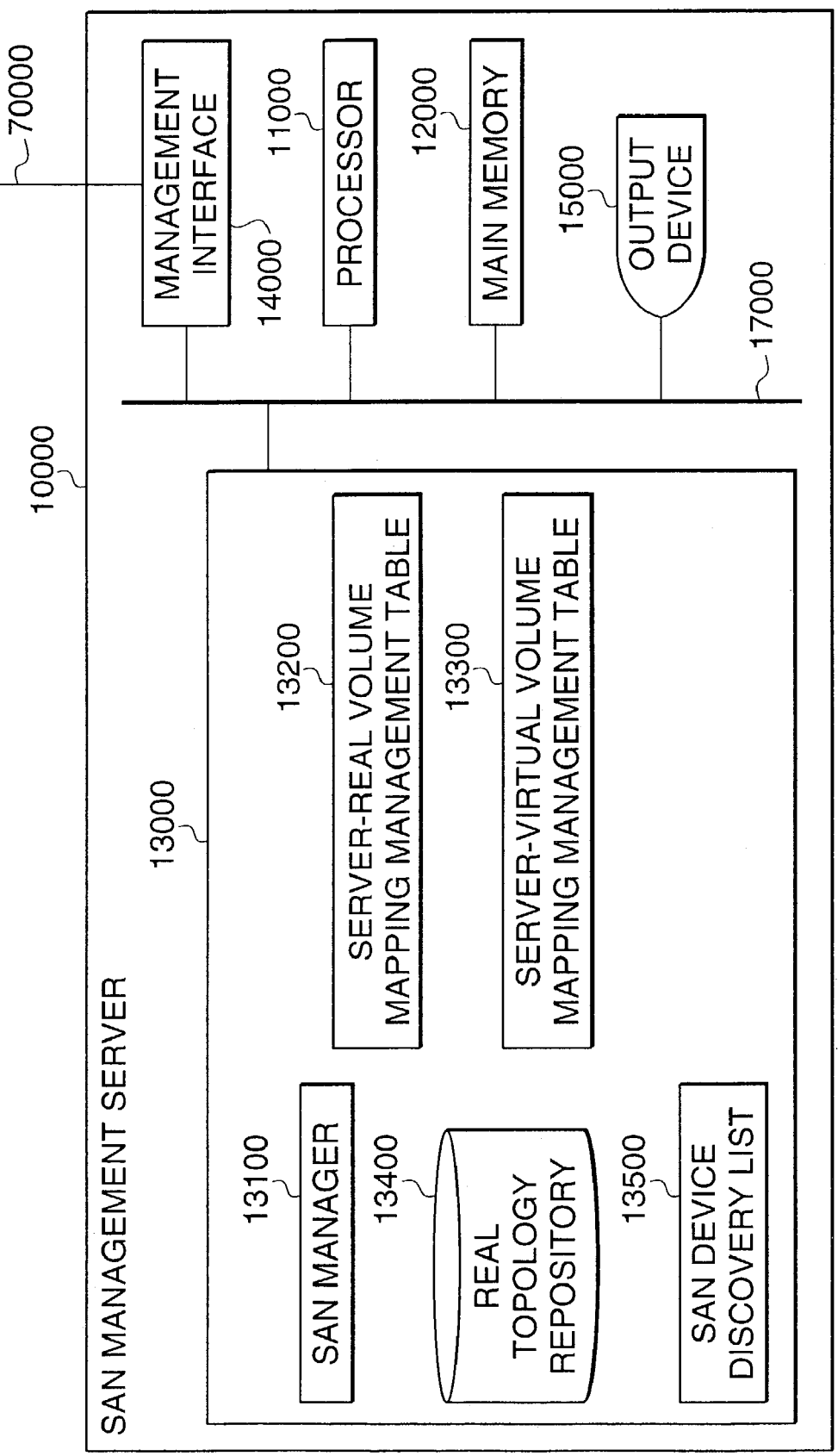
FIG. 2 shows an example of the configuration of a SAN management server.

FIG. 2 shows an example of the configuration of the SAN management server 10000. The SAN management server 10000 has a processor 11000, a main memory 12000, a local disk 13000, a management interface 14000 connected to the network for management 70000 and an output device 15000 such as a display for outputting the result of execution when processing described later is executed by the SAN manager 13100, and these are mutually connected via a channel 17000 such as an internal bus. On the local disk 13000, the SAN manager 13100 which is a program executed by the SAN management server 10000, a server-real volume mapping management table 13200 holding real volume mapping information in the SAN, a server-virtual volume mapping management table 13300 holding virtual volume mapping information in the SAN, a real topology repository 13400 which is an area for storing information collected from a management agent provided to each unit in the SAN and a SAN device discovery list 13500 holding a list of units to be managed by the SAN manager 13100 in the SAN are stored.

Figure 3:
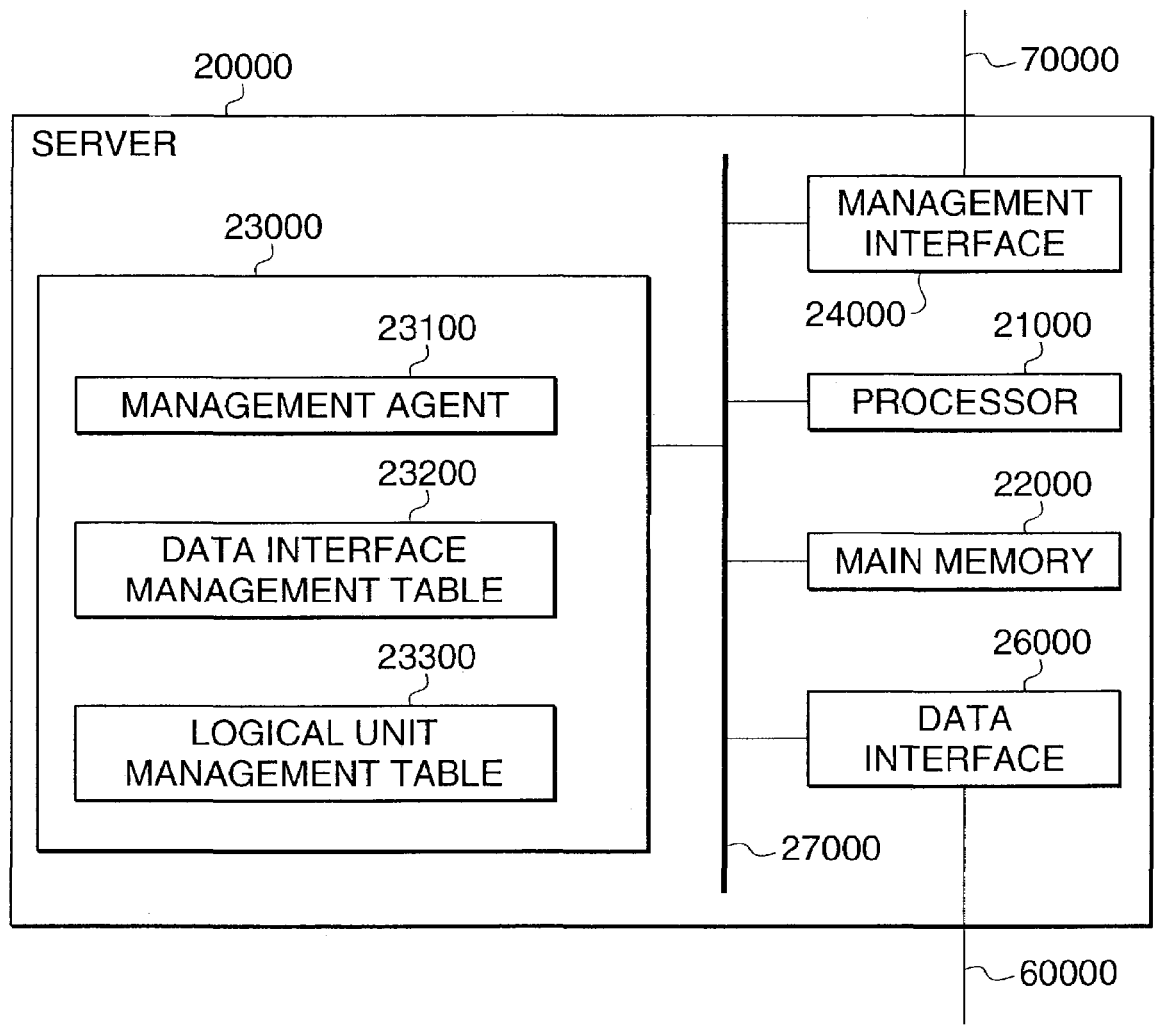
FIG. 3 shows an example of the configuration of a server.

FIG. 3 shows an example of the configuration of the server 20000. The server 20000 has a processor 21000, a main memory 22000, a local disk 23000, a management interface 24000 connected to the network for management 70000 and one or more data interfaces 26000 connected to Fibre Channel 60000, and these are mutually connected via a channel 27000 such as an internal bus. On the local disk 23000, a management agent 23100 which is a program for communicating with the SAN manager 13100 in the SAN management server 10000 and transmitting/receiving the management information of the server, a data interface management table 23200 that holds the management information of the data interface of the server and a logical unit management table 23300 that holds the management information of a volume which the server accesses are stored. In this embodiment, the servers A and B both have one data interface, however, each server may also have plural data interfaces. A unique identifier (data interface ID) in each server is allocated to the data interface of each server and in this embodiment, a value of the data interface ID of the server A is a1 and a value of the data interface ID of the server B is b1.

Figure 4:
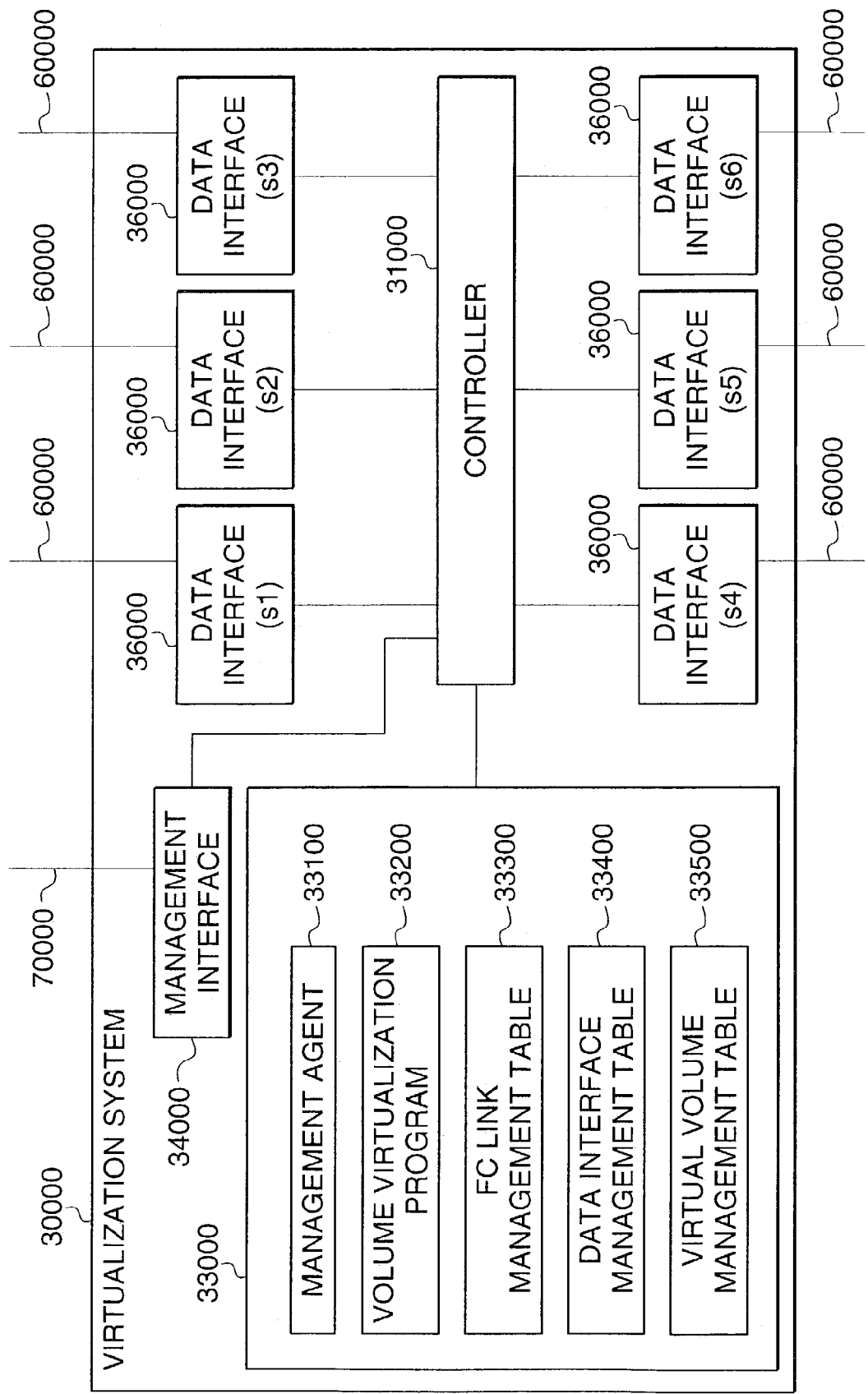
FIG. 4 shows an example of the configuration of a virtualization system.

FIG. 4 shows an example of the configuration of the virtualization system 30000. The virtualization system 30000 has a controller 31000 that realizes the switching of data transmitted/received via Fibre Channel 60000 and a virtual storage function, a main memory 33000, a management interface 34000 connected to the network for management 70000 and one or more data interfaces 36000 connected to Fibre Channel 60000, and these are mutually connected via the controller 31000. In the main memory 33000, a management agent 33100 which is a program for communicating the SAN manager 13100 and transmitting/receiving the management information of the virtualization system 30000, a volume virtualization program 33200 for realizing the virtual storage function, a FC link management table 33300 which is information showing the relation of connection between the virtualization system 30000 and each server 20000 or each storage system 40000, 50000 via Fibre Channel 60000, a data interface management table 33400 that holds the management information of the data interfaces in the virtualization system and a virtual volume management table 33500 that holds the management information of a virtual volume provided to each server 20000 by the virtualization system 30000 are stored. In this embodiment, the virtualization system 30000 has six data interfaces, however, data interfaces of an arbitrary number may also be provided. Each data interface has a unique identifier (data interface ID) in the system and in this embodiment, their values are s1, s2, s3, s4, s5 and s6.

Figure 5:
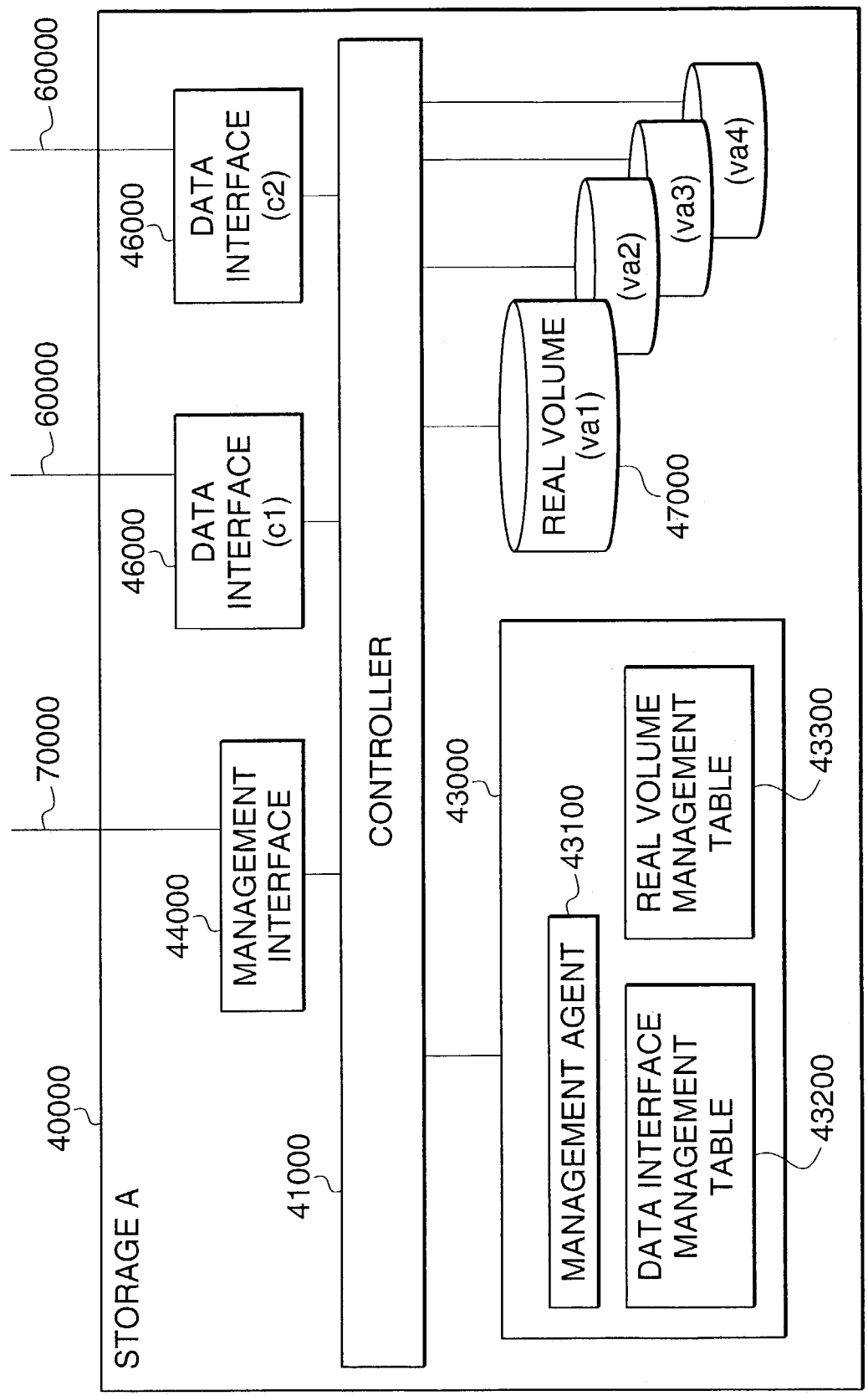
FIG. 5 shows an example of the configuration of a storage system.

FIG. 5 shows an example of the detailed configuration of the storage A 40000. The storage A 40000 has a controller 41000 that controls the storage, a main memory 43000, a management interface 44000 connected to the network for management 70000, one or more data interfaces 46000 connected to Fibre Channel 60000 and one or more real volumes 47000 each of which is a storage area provided to the server 20000 and the virtualization system 30000, and these are mutually connected via the controller 41000. In the main memory 43000, a management agent 43100 which is a program for communicating with the SAN manager 13100 and transmitting/receiving the management information of the storage A 40000, a data interface management table 43200 that holds the management information of the data interfaces in the storage A 40000 and a real volume management table 43300 that holds the management information of the real volumes 47000 in the storage A 40000 are stored. In this embodiment, the storage A 40000 has two data interfaces 46000 and four real volumes 47000, however, data interfaces 46000 of an arbitrary number and real volumes 47000 of an arbitrary number may also be provided. Each data interface 46000 and each real volume 47000 have a unique identifier (data interface ID and volume ID) in the storage and in this embodiment, values of data interface ID are c1 and c2 and values of volume ID are va1, va2, va3 and va4.

The storage B 50000 has the similar configuration to that of the storage A 40000 shown in FIG. 5. In this embodiment, the storage B 50000 also has two data interfaces and four real volumes. Values of data interface ID of the storage B 50000 are d1 and d2 and values of volume ID are vb1, vb2, vb3 and vb4.

FIG. 8 shows an example of the SAN device discovery list 13500 which the SAN management server 10000 holds. In a detection object ID field in FIG. 8, an arbitrarily allocated number in the SAN management server is registered, in a unit type field, the type of a unit in the SAN is registered, in a unit information field, the vendor of each unit and the name of each unit are registered, in an IP address information field, an address in the network for management 70000 of each unit is registered and in a virtualizing function field, it is registered whether each unit is provided with a virtualizing function or not. The SAN manager 13100 specifies the management agent of each unit based upon the list and communicates with the management agent.

FIG. 9 show examples of the data interface management table 23200 held by each server 20000. FIG. 9A shows the table of the server A, FIG. 9B shows the table of the server B and the tables hold information related to data interfaces the respective IDs of which are a1 and b1. In a data interface ID field in FIG. 9, a value of ID of the data interface 26000 with which each server 20000 is registered, in a world wide name (WWN) field, WWN of the data interface 26000 is registered and in an SCSI ID field, an identifier (an SCSI ID number) of an SCSI target device to which the data interface 26000 is connected is registered. WWN means an identifier for uniquely identifying the data interface 26000 on Fibre Channel 60000.

FIG. 10 show examples of the logical unit management table 23300 held by each server 20000. FIG. 10A shows the table of the server A and FIG. 10B shows the table of the server B. Two volumes are provided to the server A, one volume is provided to the server B and each server holds the information of volumes provided to each server in the logical unit management table 23300. In an LU ID field in the logical unit management table 23300, an identifier arbitrarily allocated to a volume provided to each server in each server is registered. In a data interface ID field, an identifier of the data interface 26000 in the server used for accessing a volume is registered, in an SCSI ID field, the SCSI ID number of an SCSI target device to which the data interface 26000 is connected is registered, in an LUN field, an SCSI logical unit number for accessing the corresponding volume in the SCSI target device is registered and in a volume information field, a vendor name, a unit name and an identifier of the volume respectively acquirable by an SCSI INQUIRY command and others of a unit that provides the volume to the server 20000 are registered.

FIG. 11 shows an example of the FC link management table 33300 held by the virtualization system 30000. The FC link management table 33300 holds information related to destinations of the connection of the data interfaces s1 to s6 of the virtualization system 30000. In a data interface ID field in the FC link management table 33300, values of IDs of the data interfaces 36000 of the virtualization system 30000 are registered, in a switch side WWN field, the WWNs of the corresponding data interfaces 36000 are registered and in a connection destination WWN field, the WWNs of the data interfaces 26000 and 46000 in the server 20000 and the storage systems 40000 and 50000 to which the data interfaces 36000 are connected are registered.

FIG. 12 shows an example of the data interface management table 33400 held by the virtualization system 30000. In FIG. 12, there is shown a case that the virtualization system 30000 provides a virtual volume via the data interfaces 36000 s1 and s2 and each server 20000 recognizes the data interfaces s1 and s2 as virtual data interfaces vs1 and vs2. In a data interface ID field of the data interface management table 33400, values of IDs of the data interfaces 36000 of the virtualization system 30000 are registered, in a virtual data interface ID field, a value of an identifier recognized as an identifier of the corresponding data interface 36000 by each server 20000 is registered and in an SCSI ID field, SCSI ID numbers allocated to the corresponding virtual data interfaces vs1 and vs2 are registered.

FIG. 13 shows an example of the virtual volume management table 33500 held by the virtualization system 30000. First, the contents of a virtual volume field will be described. In a virtual data interface ID field, values (the values of the identifiers registered in the virtual data interface ID field shown in FIG. 12) of identifiers of the virtual data interfaces vs1 and vs2 held by the virtualization system 30000 are registered, in an SCSI ID field, SCSI ID numbers allocated to the virtual data interfaces vs1 and vs2 are registered, in an LUN field, SCSI logical unit numbers for accessing the virtual volume provided to the server 20000 via the virtual data interfaces vs1 and vs2 are registered and in a virtual volume ID field, identifiers arbitrarily allocated to the virtual volumes provided to the server 20000 via the virtual data interfaces vs1 and vs2 are registered. In this embodiment, the virtualization system 30000 provides a virtual volume vv1 via the virtual data interface vs1 and provides a virtual volume vv2 via the virtual data interface vs2. The reason why there are two entries related to the virtual data interface vs1 in the virtual volume ID field is that the virtual volume vv1 provided via the virtual data interface vs1 as described later is composed of the two real volumes va2 and vb1.

Next, the contents of a real volume field of the virtual volume management table 33500 will be described. In a real data interface ID field, an identifier of the data interface 36000 used for accessing a real volume forming the virtual volume shown by the identifier registered in the virtual volume ID field in the virtualization system 30000 is registered. In an SCSI ID field, an SCSI ID number of an SCSI target device to which the real data interface 36000 is connected is registered and in an LUN field, an SCSI logical unit number for accessing a volume provided from the storage systems 40000 and 50000 via the real data interface 36000 is registered. In a real volume information field, the name of the storage system providing a real volume accessed via the real data interface 36000, an identifier and the capacity of the real volume respectively acquirable by an SCSI INQUIRY command and others are registered. The real volumes va3 and va4 accessible from the data interface s4 and the real volume vb2 accessible from the data interface s6 are recognized by the virtualization system 30000, the real volumes may compose a virtual volume in future and can be provided to the server 20000, however, currently, they are not provided to the server 20000 as a virtual volume. Therefore, information related to the real volumes va3, va4 and vb2 is registered in only the real volume field and are not registered in the virtual volume field. Also, because the real volume va1 accessible from the data interface s3 is provided to the server 20000 without being virtualized in the virtualization system 30000, information related to va1 is not registered in the virtual volume management table 33500.

FIG. 14 show examples of the data interface management tables 43200 and 53200 held by each storage system. FIG. 14A shows the table held by the storage A 40000 and FIG. 14B shows the table held by the storage B 50000. In a data interface ID field of the data interface management table 43200, values of identifiers of the data interfaces 46000 with which the storage system is provided are registered and in a WWN field, WWNs of the data interfaces 46000 are registered.

FIG. 15 show examples of the real volume management tables 43300 and 53300 held by each storage system. FIG. 15A shows the table held by the storage A 40000 and FIG. 15B shows the table held by the storage B 50000. In a real volume ID field of the real volume management table 43300, values of IDs of the real volumes with which the storage system is provided are registered, in a field of whether a path is defined or not, it is registered whether a path is defined or not used when another device accesses to the real volume, in a data interface ID field, a value of an identifier of the data interface 46000 in the storage system used to access the volume is registered, in an SCSI ID field, an SCSI ID number allocated to the data interface 46000 is registered and in an SCSI LUN field, an SCSI logical unit number for accessing the real volume is registered.

(1-2) Configuration Management Processing of Virtual Volume and Real Volume

Next, the configuration management processing of the virtual volume and the real volume executed by the SAN manager 13100 in the SAN management server 10000 will be described. Unless particularly specified, each step shall be executed by the SAN manager 13100.

Figure 16:
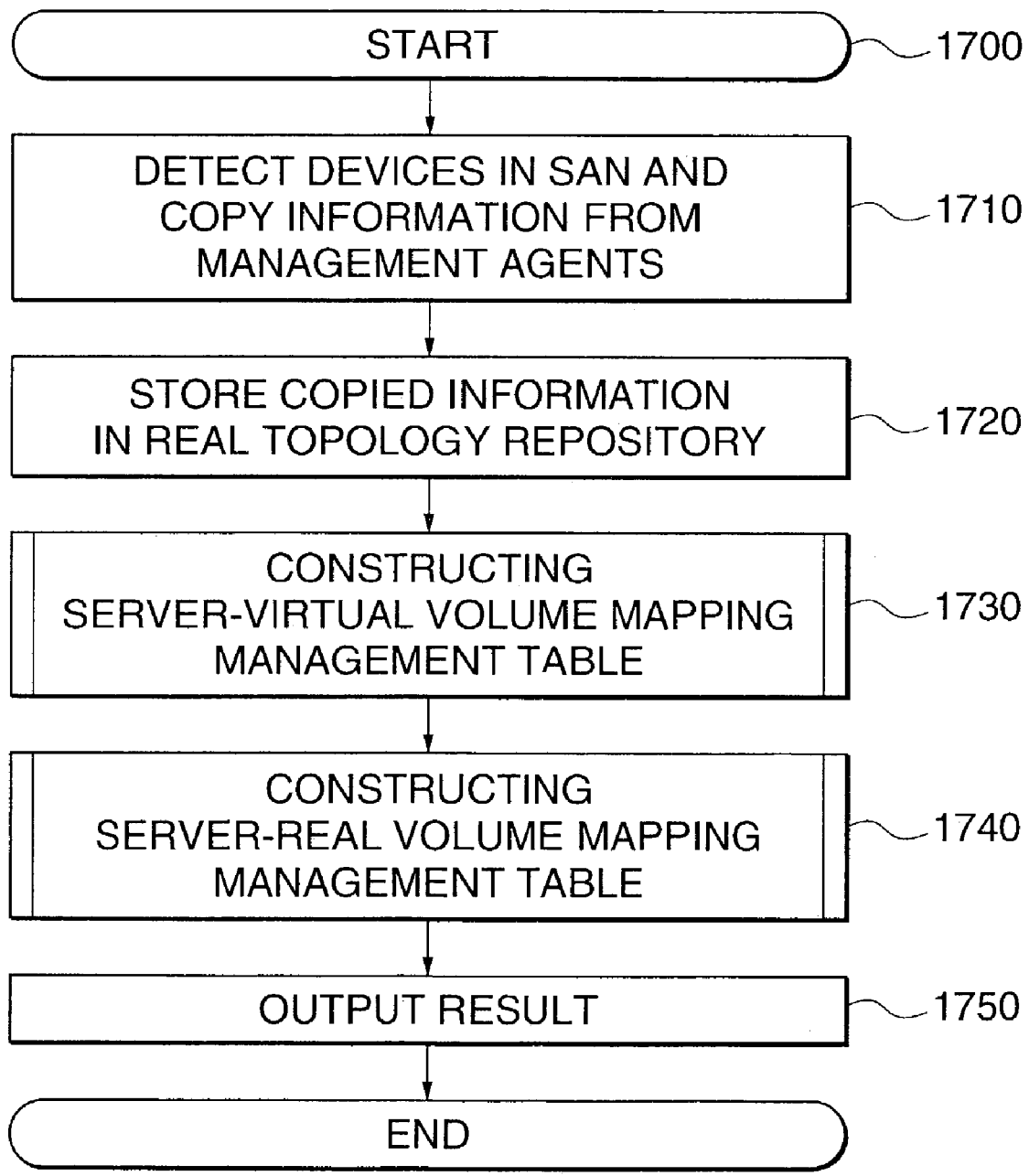
FIG. 16 is a flowchart showing an example of processing executed by the SAN management server for displaying the real topology of a storage network and virtual topology.

FIG. 16 is a flowchart 1700 showing the outline of real topology display processing and virtual topology display processing respectively executed by the SAN manager 13100. The SAN manger 13100 detects units in the SAN based upon the SAN device discovery list 13500, communicates with the management agent of each unit and copies information shown in FIGS. 9 to 15 and held by each unit (a step 1710). Next, the SAN manager 13100 stores the copied information in the real topology repository 13400 (a step 1720). Afterward, the SAN manager constructs the server-virtual volume mapping management table 13300 described later based upon the information stored in the step 1720 (a step 1730). Further, the SAN manager constructs the server-real volume mapping management table 13200 described later based upon the information in the real topology repository 13400 and the server-virtual volume mapping management table 13300 (a step 1740). Finally, the SAN manager outputs real topology and virtual topology based upon the contents of the virtual volume mapping management table 13300 and the contents of the server-real volume mapping management table 13200 (a step 1750) and terminates the processing.

FIG. 17 is a flowchart showing detailed processing in the step 1730 for constructing the server-virtual volume mapping management table 13300 executed by the SAN manager 13100. FIG. 7 shows an example of the server-virtual volume mapping management table 13300 constructed by the processing shown in FIG. 17.

The SAN manager 13100 applies the following processing to all entries in each of all logical unit management tables 23300 (see FIG. 10) received from each server 20000 and stored in the real topology repository 13400 (a step 1810).

First, the SAN manager 13100 generates a new entry in the server-virtual volume mapping management table 13300 and registers newly allocated virtual mapping ID 13301. Further, the SAN manager 13100 registers a name 13302 of the server that transmits the logical unit management table 23300 being processed, data interface ID 13304 stored in the volume management table 23300 and LU ID 13303 (a step 1820). Next, the SAN manager 13100 searches a data interface of a switch to which the registered data interface 13304 is connected and registers a name 13305 of the switch and data interface ID 13306. Concretely, the SAN manager 13100 first retrieves the data interface management table 23200 (see FIG. 9) received from the corresponding server and stored in the real topology repository 13400 using the data interface ID 13304 of the server registered in the virtual volume mapping management table 13300 as a key and searches WWN of the corresponding data interface ID. Further, the SAN manager 13100 retrieves the FC link management table 33300 (see FIG. 11) received from the virtualization system 30000 and stored in the real topology repository 13400 using the corresponding WWN as a key, retrieves to which data interface of which switch the corresponding server is connected and registers the result as a name 13305 of a connected switch and the data interface ID 13306 of the connected switch (a step 1830). Information related to the server is registered in a left half (a server field) of the virtual volume mapping management table 13300 by the above processing.

Next, the SAN manager executes processing for registering information in a right half (a storage field) of the server-virtual volume mapping management table 13300. The SAN manager 13100 checks whether or not the volume registered in the corresponding logical unit management table 23300 is provided by the virtualization system 30000 based upon the vendor name and the unit name registered as volume information in the logical unit management table 23300. Concretely, the SAN manager 13100 retrieves the SAN device discovery list 13500 using the unit name as a key, checks whether the corresponding unit is provided with a virtualizing function or not and determines that the virtualizing function is provided from the virtualization system 30000 if the unit is provided with the virtualizing function (a step 1840). In this embodiment, if a volume is provided from a switch A, it is determined that the volume is provided from the virtualization system 30000. According to the result in the step 1840, the processing is branched as follows (a step 1850).

If a volume is provided from a unit other than the virtualization system, the SAN manager 13100 registers a unit name and volume ID registered in the volume information field of the logical unit management table 23300 as a storage name 13309 and volume ID 13311 in the storage field of the server-virtual volume mapping management table 13300. Further, the SAN manager 13100 retrieves the real volume management table 43300 (see FIG. 15) received from the storage system using the registered volume ID 13311 as a key, searches ID of the data interface 46000 used for accessing the corresponding real volume and registers the result as storage data interface ID 13310 (a step 1860). The SAN manager 13100 searches a data interface 36000 of a switch to which the registered storage data interface ID 13310 is connected and registers a name of the switch and data interface ID. Concretely, the SAN manager 13100 first retrieves the data interface management table 43200 (see FIG. 14) received from the corresponding storage using the storage data interface ID 13310 as a key, searches WWN of the corresponding storage data interface, further retrieves the FC link management table 33300 (see FIG. 11) received from the virtualization system 30000 using the WWN as a key and checks to which data interface 36000 of which switch the corresponding storage data interface 46000 is connected. The SAN manager 13100 registers the result of the check as a connection destination switch name 13307 and a connection destination switch data interface ID 13308 (a step 1870).

If it is determined in the step 1850 that a volume is provided from the virtualization system 30000, the SAN manager 13100 executes the following processing. First, the SAN manager 13100 registers the unit name and the volume ID registered in the volume information field of the volume management table 23300 as a storage name 13309 and volume ID 13311 in the server-virtual volume mapping management table 13300. Further, the SAN manager 13100 retrieves the virtual volume management table 33500 received from the virtualization system 30000 using the registered volume ID 13311 as a key, searches the ID of the virtual data interface used for accessing the corresponding virtual volume in the virtualization system 30000 and registers the result as storage data interface ID 13310 (a step 1861). Next, the SAN manager searches a data interface of a switch corresponding to the virtual data interface of the virtualization system 30000 and registers a name of the switch and data interface ID. Concretely, the SAN manager 13100 retrieves the data interface management table 33400 (see FIG. 12) received from the virtualization system 30000 using the storage data interface ID 13310 as a key, searches a data interface ID of a switch corresponding to the virtual data interface and registers the result as a connection destination switch name 13307 and connection destination switch data interface ID 13308 (a step 1871).

If the logical unit management table 23300 (see FIG. 10) is not stored in the real topology repository 13400 because no unit is registered in the SAN device discovery list 13500 as well as if a unit is provided with no management interface, the type of the unit cannot be determined exceptionally in the step 1850. If there is no information registered in the volume information field of the logical unit management table 23300 as described above, a storage field is blanked (a step 1862).

When the above steps are applied to all entries in each of all the logical unit management tables 23300 received from each server and stored in the real topology repository 13400 by the SAN manager 13100, processing in the step 1730 is finished.

Figure 18:
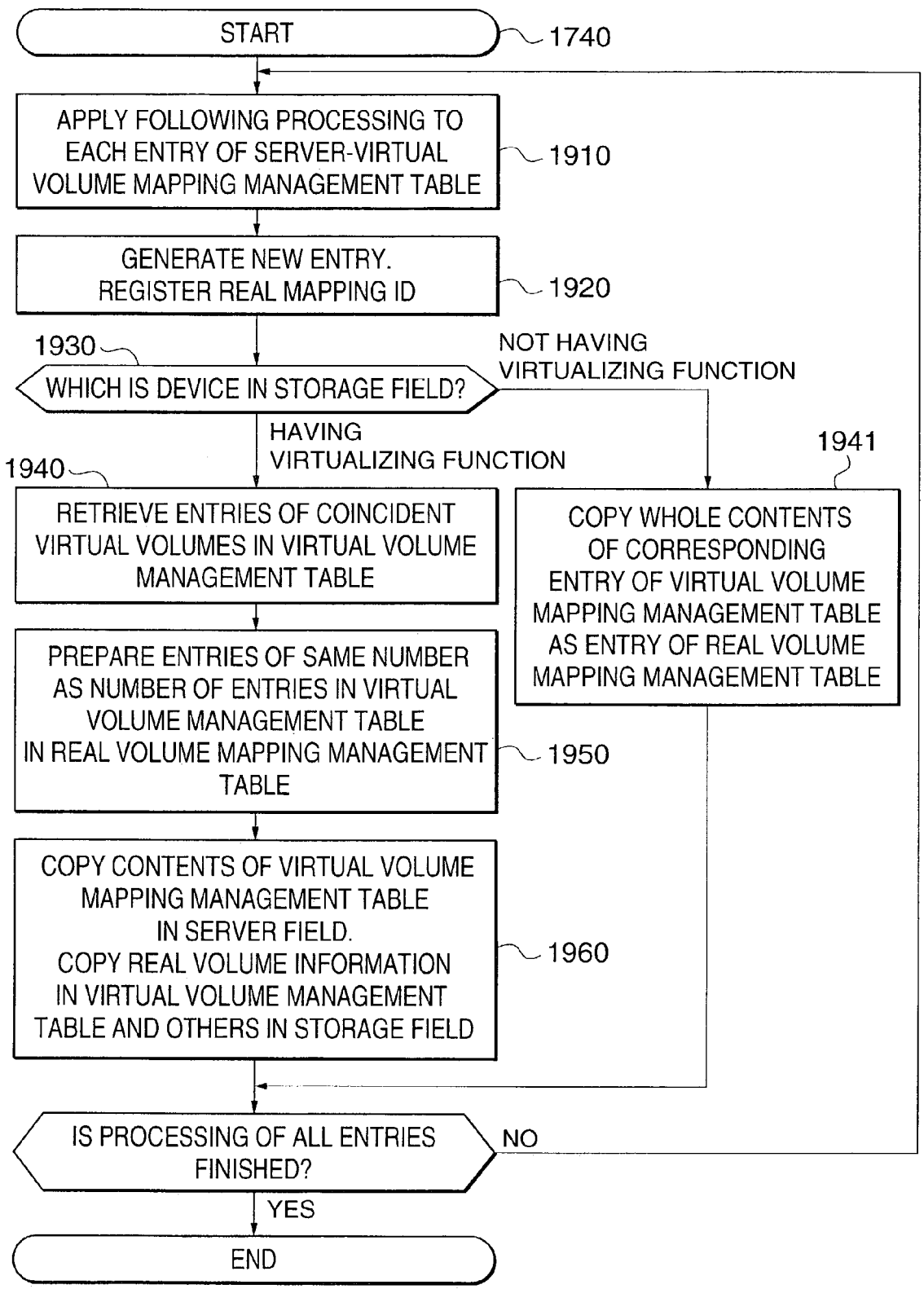
FIG. 18 is a flowchart showing an example of the detailed processing contents of a step executed by the SAN management server for constructing the real volume mapping management table.

FIG. 18 shows the flow of detailed processing in the step 1740 for constructing the server-real volume mapping management table 13200 executed by the SAN manager 13100. FIG. 6 shows an example of the server-real volume mapping management table 13200 constructed by processing shown in FIG. 18.

The SAN manager 13100 applies the following processing to all entries in the server-virtual volume mapping management table 13300 constructed in the step 1730 (a step 1910).

First, the SAN manager 13100 generates a new entry and registers newly allocated real mapping ID 13201 (s step 1920). Next, the SAN manager 13100 determines whether a unit shown by the corresponding storage name has a virtualizing function or not based upon a storage name 13309 in each entry of the server-virtual volume mapping management table 13300. Concretely, the SAN manager retrieves the SAN device discovery list 13500 using a storage name 13309 as a key and checks whether the corresponding unit has a virtualizing function or not (a step 1930).

If the corresponding unit has a virtualizing function, the SAN manager 13100 executes the following steps. The SAN manager 13100 retrieves the virtual volume management table 33500 (see FIG. 13) received from the unit shown by the storage name 13309 using volume ID 13311 entered in the virtual volume mapping management table 13300 as a key and extracts an entry in the virtual volume ID field coincident with the volume ID 13311 (a step 1940). Next, the SAN manager prepares entries of the same number as the number of entries acquired by the retrieval in the server-real volume mapping management table 13200 (a step 1950). The SAN manager 13100 copies the contents (from 13302 to 13306) of the server field of entries being processed of the server-virtual volume mapping management table 13300 in a server field (from 13202 to 13206) of the prepared entries. In a switch data interface ID field 13208 of a storage field, the SAN manager copies the contents of the real data interface ID field of the real volume information field of the entries extracted in the step 1940 of the virtual volume management table 33500. In a storage name field 13209 and a volume ID field 13211 in the storage field, the SAN manager copies the storage name and the volume ID respectively registered as real volume information in the real volume information field of the corresponding entries of the virtual volume management table 33500. In the corresponding virtual mapping ID field 13212, the SAN manager registers the contents of the virtual mapping ID 13301 in the server-virtual volume mapping management table 13300. In a switch name field 13207 in the storage field, the SAN manager copies the contents of the switch name 13307 in the storage field of the server-virtual volume mapping management table 13300 (a step 1960). Further, the SAN manager 13100 retrieves the real volume management table 43300 (see FIG. 15) received from the storage system using the volume ID registered in the volume ID field 13211 in the storage field of the server-real volume mapping management table 13200 as a key, retrieves ID of a data interface to which the corresponding volume is connected and registers this in a storage data interface ID field 13210 in the storage field of the server-real volume mapping management table 13200.

If it is determined in the step 1930 that the corresponding unit has no virtualizing function, the SAN manager 13100 copies entries (from 13302 to 13311) being processed of the server-virtual volume mapping management table 13300 into entries (from 13202 to 13211) of the server-real volume mapping management table 13200 and registers the contents of the virtual mapping ID field 13301 of the virtual volume mapping management table 13300 in the corresponding virtual mapping ID field 13212 of the server-real volume mapping management table 13200.

The entries are registered in a field from 13201 to 13212 in the server-real volume mapping management table 13200 by the above processing.

When the above steps are applied to all entries in the server-virtual volume mapping management table 13300 by the SAN manager 13100, the processing shown in the step 1740 is finished.

Figure 19A:
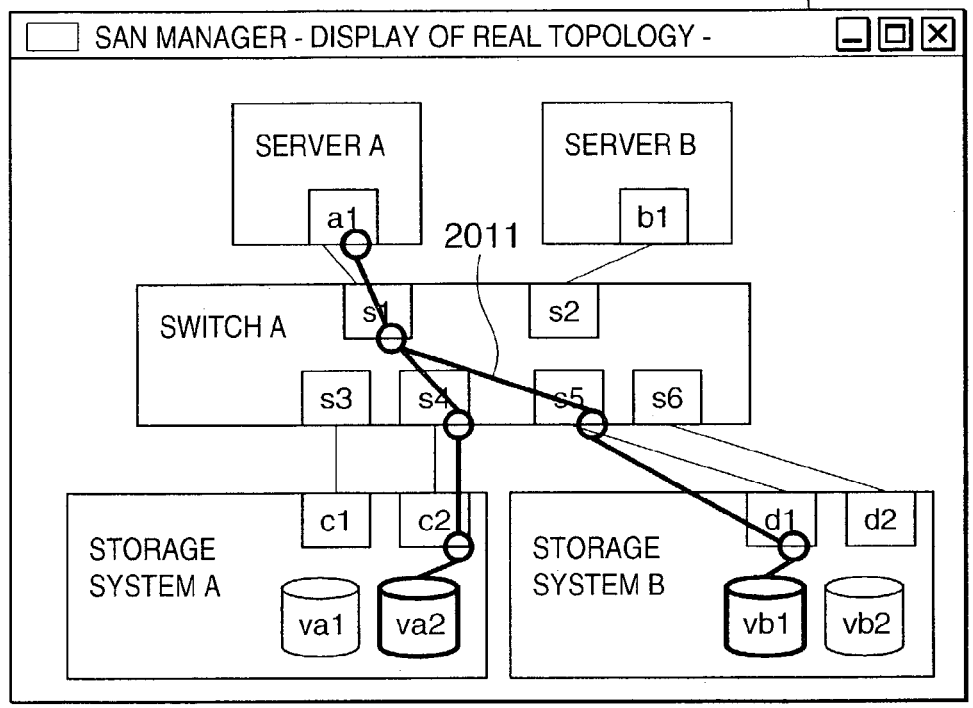
FIG. 19 show examples of the display of real topology and the display of virtual topology respectively output by the SAN management server.
Figure 19B:
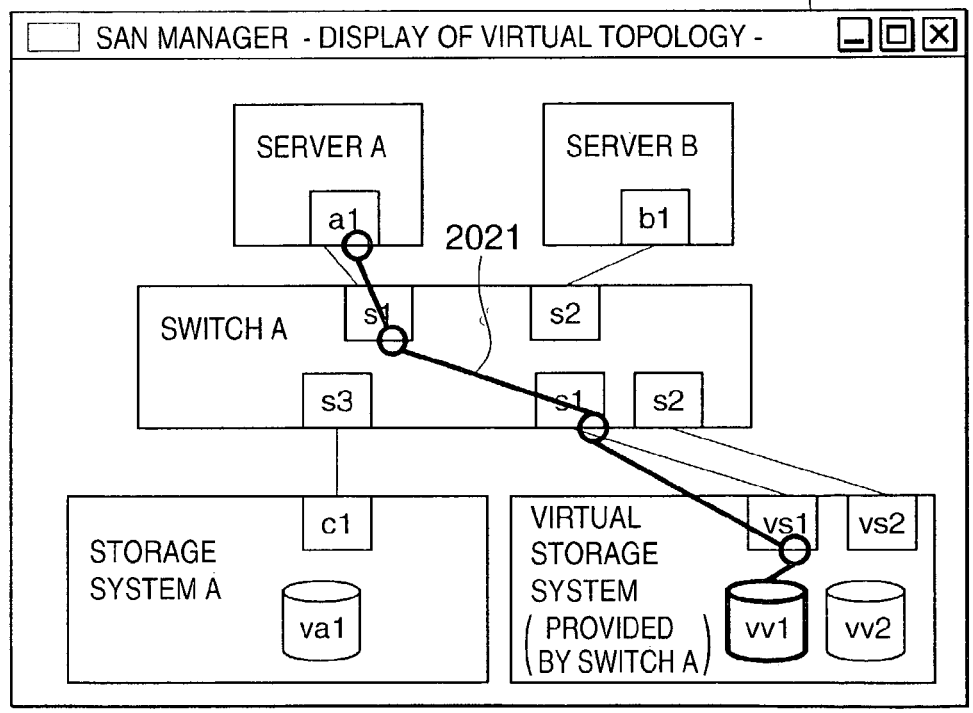

FIG. 19 shows examples of the display of real topology and the display of virtual topology which the SAN manager 13100 outputs to output means 15000 based upon the mapping tables shown in FIGS. 6 and 7. An example of output in which topology among the server, the switch and the storage is shown based upon the contents of the server-real volume mapping management table 13200 is the display of real topology 2010, and an example of output in which topology among the server, the switch and the storage (including the virtual storage) is shown based upon the contents of the server-virtual volume mapping management table 13300 is the display of virtual topology 2020.

For example, a case where a SAN administrator gives an instruction for specifying virtual mapping 2021 from the virtual volume vv1 to the server A in the display of virtual topology 2020 to input means of the SAN management server 10000 will be described below. The virtual mapping 2021 is displayed based upon data registered on a line on which the virtual mapping ID 13301 is vm2 in the server-virtual volume mapping management table 13300 shown in FIG. 7. When the virtual mapping 2021 is specified by the SAN administrator, the SAN manager 13100 retrieves the server-real volume mapping management table 13200 shown in FIG. 6 using the virtual mapping ID vm2 corresponding to the virtual mapping 2021 as a key. The SAN manager 13100 displays real mapping in the display of real topology 2010 based upon data registered on the whole line on which the corresponding virtual mapping ID 13212 is vm2 in the server-real volume mapping management table 13200. Real mapping displayed as a result is equivalent to real mapping 2011 shown in FIG. 19. Also for example, a case where a SAN administrator gives an instruction for specifying the real mapping 2011 from the real volume va2 to the server A in the display of real topology 2010 to the input means of the SAN management server 10000 will be described below. The real mapping 2011 from the real volume va2 to the server A is displayed based upon data registered on a line on which real mapping ID 13201 is pm2 in the server-real volume mapping management table 13200 shown in FIG. 6. When the real mapping 2011 is specified by the SAN administrator, the SAN manager 13100 retrieves the server-virtual volume mapping management table 13300 shown in FIG. 7 using a value vm2 of the virtual mapping ID 13212 stored in the corresponding field of the real mapping 2011 as a key. The SAN manger 13100 displays the virtual mapping 2021 in the display of virtual topology 2020 based upon data registered on a line on which the virtual mapping ID 13212 is vm2 in the virtual volume mapping management table 13300. The SAN manager 13100 also retrieves the server-real volume mapping management table 13200 shown in FIG. 6 using a value vm2 of the virtual mapping ID 13212 as a key and retrieves another line of real mapping on which a value of the virtual mapping ID 13212 is vm2. If there is a coincident line, the SAN manager displays the corresponding real mapping 2011 in the display of real topology 2010. Virtual mapping displayed as a result is equivalent to the virtual mapping 2021 shown in FIG. 19.

As a result, a SAN administrator can easily know correspondence between the real volume and the virtual volume based upon the display of both topology.

Even if the configuration of the SAN is complex, the SAN administrator can easily grasp the relation between the server and the virtual volume and the relation between the virtual volume and the real volume by the configuration management technique of the virtual volume and the real volume described in this embodiment.

Second Embodiment Failure Monitoring of Virtualization System

One example of a failure monitoring function of a virtualization system 30000 will be described below. A failure monitoring function by the current SAN management software often utilizes a Trap message defined in RFC1157, "A Simple Network Management Protocol (SNMP)" prepared by Internet Engineering Task Force (IETF). However, since a volume allocated to a server by storage virtualization technology is virtualized, it is difficult to specify a failure location at a virtual volume level.

Then, in this embodiment, a SAN management server holds an event translation dictionary for translating the contents of a failure notification message received from each unit in the SAN in addition to the configuration shown in FIG. 2. A SAN manager 13100 that receives failure notification issued by each unit detects the effect that failure has upon I/O access to a real volume based upon the event translation dictionary and the configuration information of the SAN acquired from each management agent and stored in a real topology repository. Further, the SAN manager 13100 refers to virtual volume mapping information and detects the effect that the failure has upon I/O access to a virtual volume. The SAN manager 13100 reduces a load of specifying failure and taking measures for the failure of a SAN administrator by outputting the results of above detection related to virtual volume mapping information and real volume mapping information.

(2-1) Configuration of SAN According to Second Embodiment

As the configuration of the SAN and the configuration of each unit in the SAN in a second embodiment are substantially equal to the configuration of them described in the first embodiment, only different points will be described below.

Figure 20:
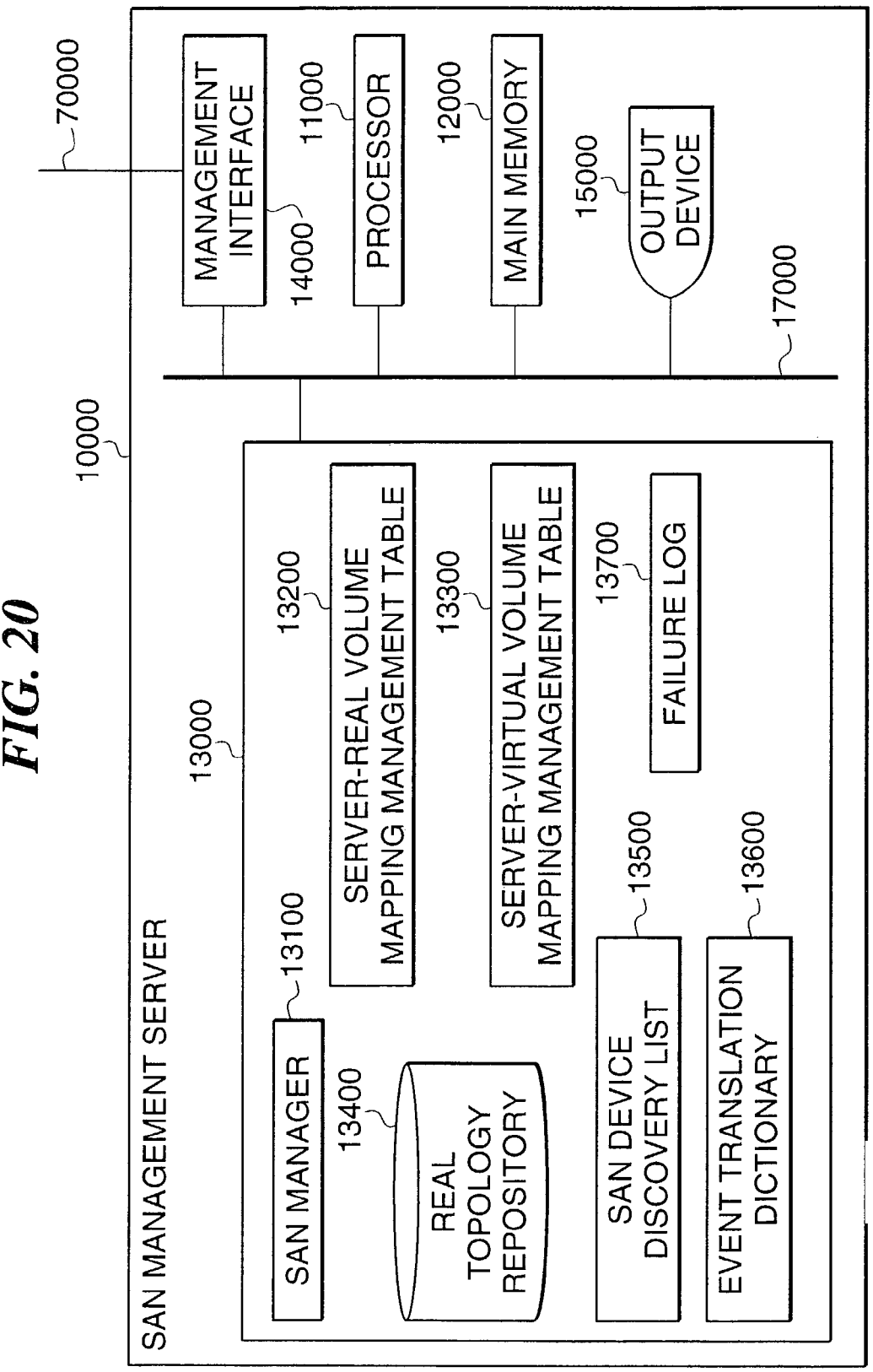
FIG. 20 shows an example of another configuration of the SAN management server when a second embodiment is applied.

FIG. 20 shows an example of the configuration of a SAN management server 10000 in the second embodiment. In the second embodiment, the SAN management server 10000 is provided in a local disk 13000 with one or more event translation dictionaries 13600 for translating the contents of a failure notification message received from each unit in the SAN and a failure log 13700 for recording the contents of an event.

FIG. 26 shows examples of the format of an SNMP Trap message which the SAN manger 13100 in the SAN management server 10000 receives from each unit in the SAN and an SNMP Trap message. An SNMP Trap message means a failure notification message which a management agent of each unit in the SAN transmits to the SAN management server 10000. FIG. 26A shows the format of the SNMP Trap message. An SNMP message is composed of a message header, a community name of a destination to which the message is transmitted, a protocol data unit (PDU) type showing a message type, an enterprise showing a vendor name of a unit that transmits the message, an agent address showing an IP address of the destination, a generic trap type and a specific trap type respectively showing a type of a Trap message, a time stamp showing time at which the message is transmitted and a field of variable bindings for storing the contents of the message. When a value in a PDU type field is "4", the corresponding message is identified as an SNMP Trap message. When a value in a generic trap type field is "6;", the corresponding SNMP Trap message is identified as a Trap message based upon definition proper to a vendor of a unit that transmits the message and the trap message is required to be translated based upon the contents of a specific trap type field defined by each vendor and a variable bindings field (shown by underlines in FIG. 26).

FIG. 26B shows an example of the SNMP Trap message which a storage A 40000 transmits to notify the hardware failure of the storage itself in this embodiment. As the PDU type of the message shown in FIG. 26B is 4, the message is recognized as an SNMP Trap message and as a generic trap type is 6, the message is recognized as a Trap message based upon definition proper to a vendor of a unit that transmits the message. Further, in this embodiment, a vendor shall define so that a type of failure is stored in a specific trap type and a failure code showing a component in which the failure occurs is stored in variable bindings. Therefore, the SNMP Trap message shown in FIG. 26B shows that hardware failure occurs in a component identified by a failure code 30c1.

FIG. 21 shows an example of a translation dictionary of an SNMP Trap message related to the storage A 40000 with which the SAN management server 10000 is provided in the event translation dictionary 13600. This dictionary lists the failure of which component is shown by a failure code in the variable bindings field of an SNMP Trap message issued by the storage A 40000, and a component in which failure occurs corresponding to each failure code and an identifier of the corresponding component are registered.

FIG. 22 shows the failure log 13700 with which the SAN management server 10000 is provided. In the failure log, an event ID which the SAN manager 13100 allocates when the manager receives a failure notification message, a name of a unit that transmits the failure notification message, a component of the unit in which failure occurs, an ID of real mapping including the corresponding component and an ID of virtual mapping including the corresponding component are registered.

(2-2) Failure Monitoring Process of Virtualization System in Second Embodiment

Figure 23A:
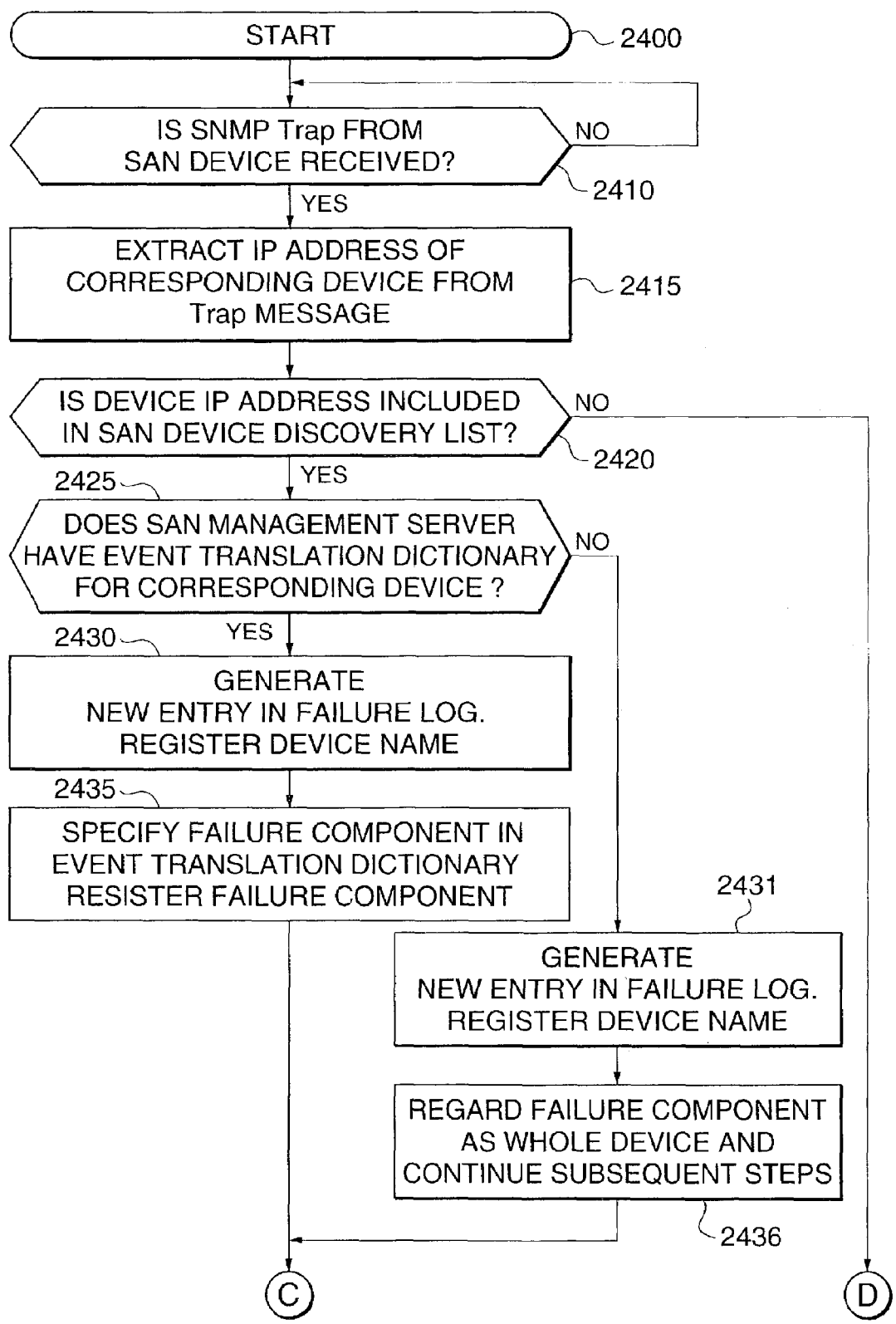
FIG. 23 is a flowchart showing an example of failure monitoring processing executed by the SAN management server.
Figure 23B:
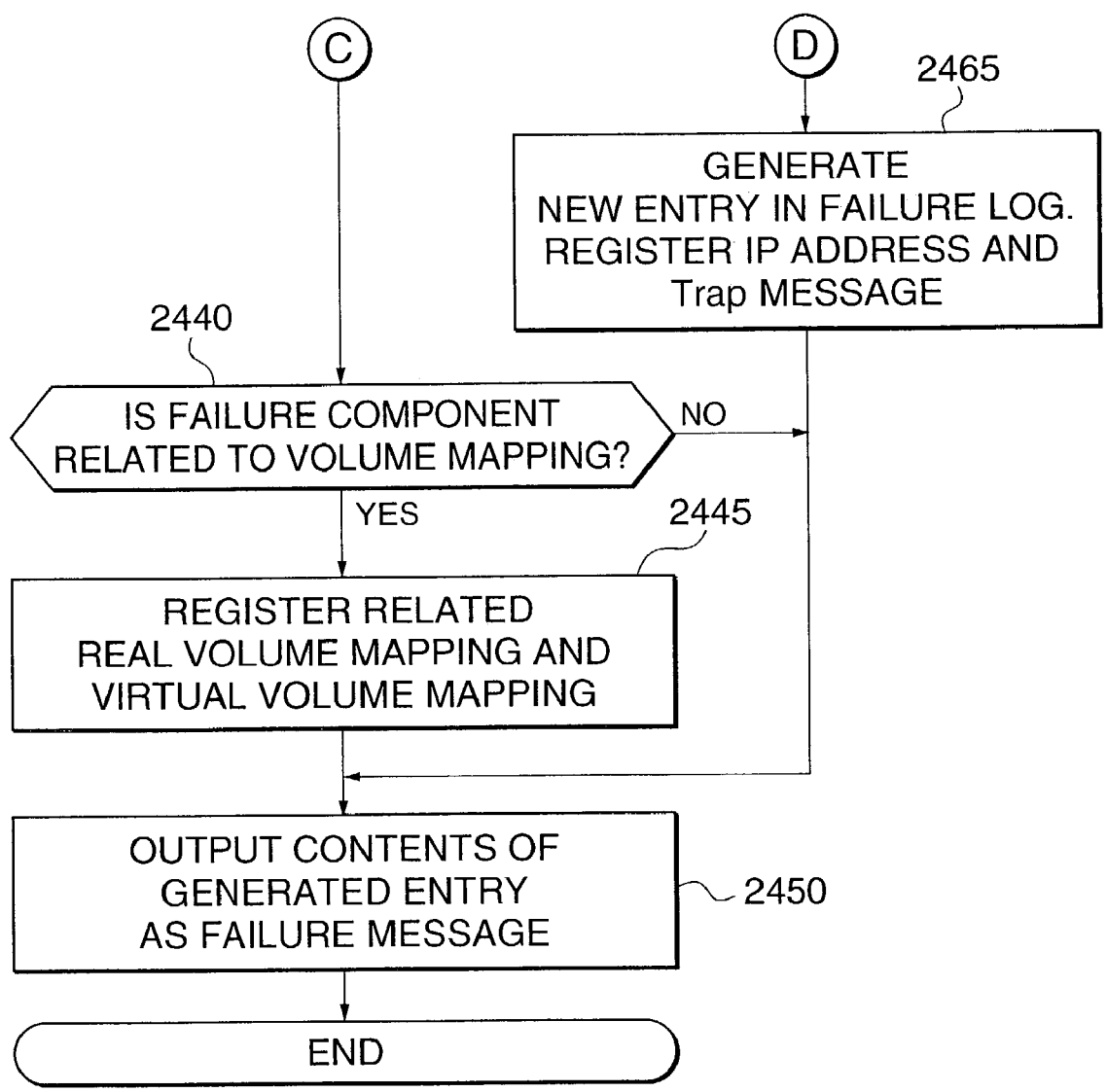

FIG. 23 is a flowchart 2400 showing a failure monitoring process executed by the SAN manager 13100 in the SAN management server 10000. Unless particularly specified, each step shall be executed by the SAN manager 13100.

The SAN manager 13100 waits until an SNMP Trap message from a unit is received (a step 2410). When the SAN manager receives the message, it extracts an IP address of the unit that issues the message from an agent address field of the message (a step 2415) and retrieves the SAN device discovery list 13500 stored in the real topology repository 13400 using the extracted IP address as a key (a step 2420).

If the IP address does not exist in the SAN device discovery list 13500, the SAN manager cannot analyze the contents of the trap message because the corresponding message is a Trap message from an unregistered unit. Therefore, the SAN manager generates a new entry in the failure log 13700, allocates event ID, outputs the IP address as a unit having failure and the Trap message itself as a component having the failure (a step 2465) and terminates the process.

If in the step 2420, the extracted IP address exists in the SAN device discovery list 13500 and a unit that issues the trap message can be specified, the SAN manager checks whether or not the SAN management server 10000 is provided with an event translation dictionary of the corresponding unit (a step 2425). If the SAN management server is provided with the event translation dictionary, the SAN manager generates a new entry in the failure log 13700, allocates an event ID and registers the unit (a step 2430). Next, the SAN manger retrieves the event translation dictionary using a variable bindings field of the trap message as a key, specifies a component having failure and registers the component and its identifier in the failure log 13706 (the step 2430). If in the step 2425, the SAN manger determines that the SAN management server is not provided with the event translation dictionary, the SAN manager generates a new entry in the failure log 13700, allocates an event ID and registers a name of the unit (a step 2431). Or the SAN manager regards a component having failure as the whole unit, registers the whole unit as the component having the failure in the failure log 13700 and continues the succeeding steps (a step 2436).

After the SAN manager registers the component having the failure in the failure log 13700, the SAN manager checks whether the registered component has relation to a real volume or not (a step 2440). Concretely, the SAN manager retrieves whether or not there is an entry coincident with an entry in a real volume mapping management table 13200 using the name of the unit having failure and the component having failure or the identifier of the component having failure as a key. If there is the coincident entry, the SAN manager extracts real mapping ID 13201 and virtual mapping ID 13212 from the entry and copies them in an entry being generated in the failure log 13700 as a real volume and a virtual volume (a step 2445). Finally, the SAN manager outputs the contents of the generated entry in the failure log as a failure message (a step 2450). In the step, the failure monitoring process by the virtualization system 30000 is finished.

FIG. 22 shows the failure log generated as a result of the execution of processing shown in FIG. 23 by the SAN manager 13100 that receives an SNMP Trap message if the SNMP Trap message including a failure code 30c2 showing the failure of a data interface c2 is issued from the storage A 40000. As the data interface c2 of the storage A 40000 is related to virtual mapping ID vm2 in the server-real volume mapping management table 13200 and the virtual mapping ID vm2 is related to real mapping ID pm2 and real mapping ID pm3 in the server-real volume mapping management table 13200, the failure log 13700 has the contents shown in FIG. 22.

Figure 24A:
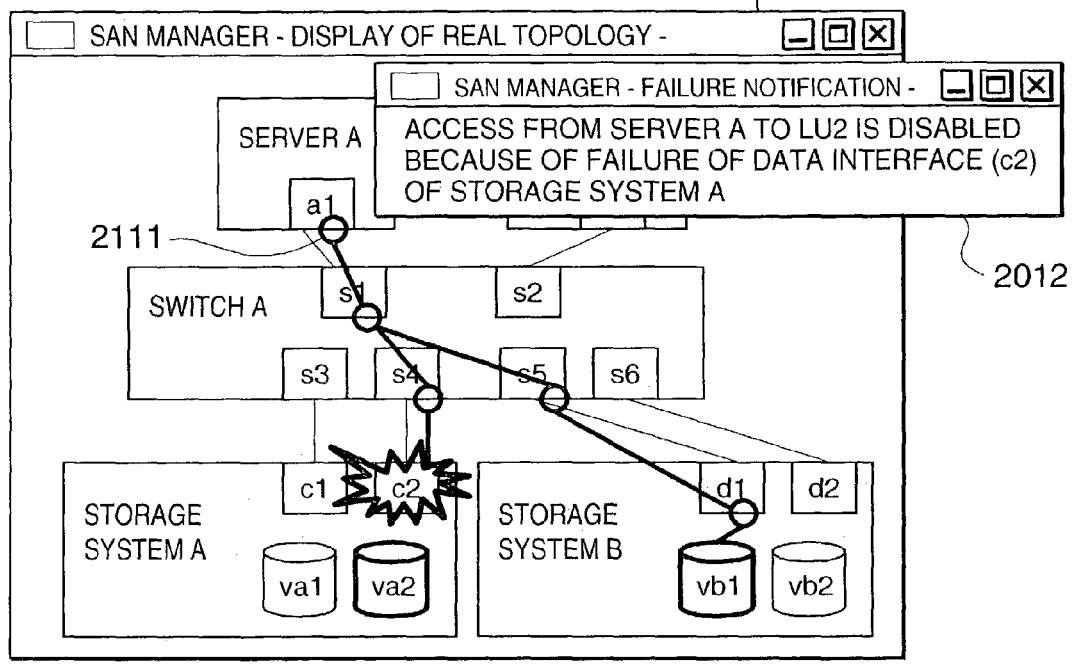
FIG. 24 show examples of failure notification display output by the SAN management server.
Figure 24B:
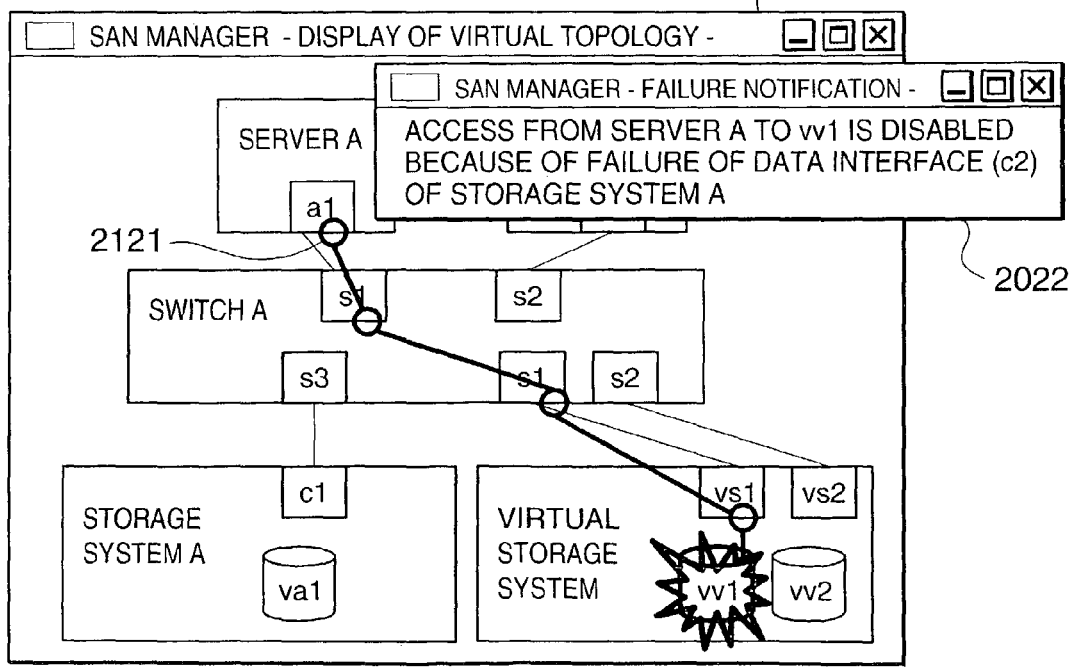

FIG. 24 show examples of a failure notification message output to output means 15000 by the SAN manager 13100 based upon the display of real topology and the display of virtual topology which are respectively shown in FIG. 19 and to which the contents of the failure log 13700 shown in FIG. 22 are added.

An example of output based upon the contents of the server-real volume mapping management table 13200 is the display of real topology 2010 and real mapping which is registered in the failure log 13700 and which real mapping ID denotes is displayed as real mapping 2111 influenced by failure in the display of real topology 2010. Further, a name of a unit having failure and a component having the failure respectively registered in the failure log 13700 and LU ID 13203 registered in the server-real volume mapping management table 13200 corresponding to a real mapping ID registered in the failure log 13700 are displayed (a failure notification message 2012 in the display of real topology).

Further, the SAN manager 13100 displays virtual mapping which virtual mapping ID registered in the failure log 13700 denotes as virtual mapping 2121 influenced by failure in the display of virtual topology 2020 output based upon the contents of the server-virtual volume mapping management table 13300. A name of a unit having failure and a component having the failure respectively registered in the failure log 13700 and volume ID 13311 registered in the server-virtual volume mapping management table 13300 corresponding to a virtual mapping ID registered in the failure log are also displayed (a failure notification message 2022 in the display of virtual topology).

A SAN administrator can easily grasp what effect the hardware failure of each unit has upon a real volume and a virtual volume by using the failure monitoring method by the virtualization system 30000 described in this embodiment.

Third Embodiment Volume Configuration Variation Check

A SAN administrator can allocate a virtual volume to a server 20000 without being conscious of real volumes of multiple heterogeneous storage systems by a virtual volume management function of a virtualization system 30000. However, if a virtual volume is allocated to the server 20000 in consideration of performance and reliability for example, the SAN administrator may want to allocate the virtual volume, being conscious of a real volume forming the virtual volume and topology between the server 20000 and the real volume. A SAN in which high availability and reliability such as operation without disruption for 24 hours for 365 days are desired has a failsafe configuration such as a normal system and a stand-by system in the event of failure. In such an environment, system design is required with physical configuration taken into consideration so that the normal system and the stand-by system do not share resources. Therefore, when a virtual volume and a real volume are generated under the environment of virtualization, a function for checking by what physical resources the volumes are provided is also required.

In a third embodiment, therefore, a technique will be described in which when the SAN administrator generates a virtual volume utilizing a SAN manager 13100, the SAN manager 13100 provides related virtual volume mapping information and related real volume mapping information and supports work for the SAN administrator to generate the virtual volume. In the third embodiment, a SAN management server 10000 is configured so that the SAN management server 10000 checks a request by the SAN administrator for generating a virtual volume based upon the virtual volume mapping information and the real volume mapping information, outputs, as the case may be, a message that the volume in the request shares resources with a volume to which a resource is already allocated and notifies the SAN administrator of it.

The configuration of the SAN and the configuration of each in the SAN in the third embodiment are similar to those in the first embodiment. However, in the third embodiment, the SAN management server 10000 is further provided with an input device such as a keyboard and a mouse in addition to the configuration shown in FIG. 2.

Figure 25:
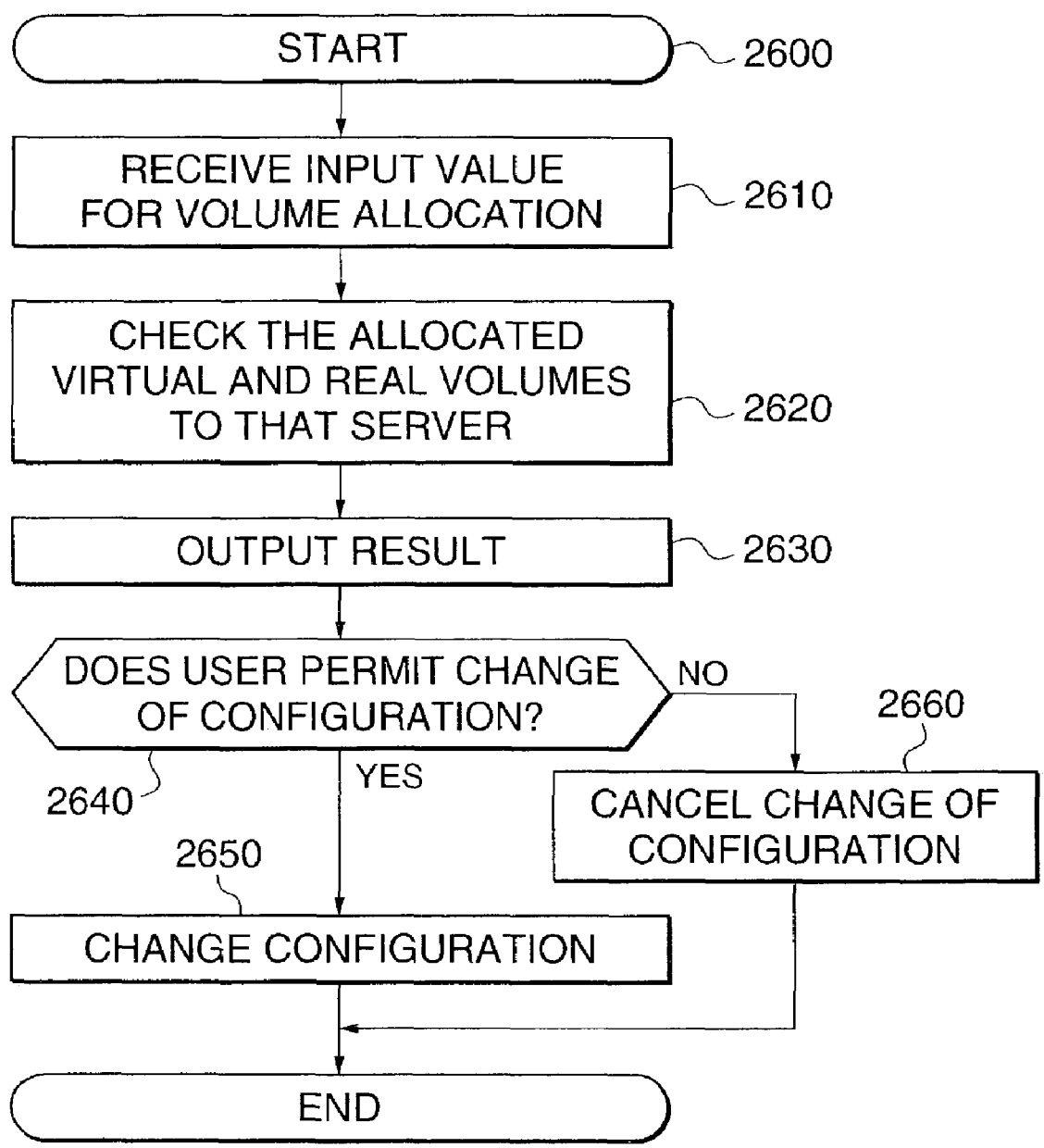
FIG. 25 is a flowchart showing an example of processing executed by the SAN management server for checking the change of the configuration of a volume.

FIG. 25 is a flowchart 2600 showing processing for checking the variation of the configuration of a volume executed by the SAN manager 13100 in the SAN management server 10000. Unless particularly specified, the SAN manager 13100 shall execute each step. The SAN manager 13100 receives an input value for the allocation of a volume from the SAN administrator (a step 2610). The input value means the attribute such as a server of a destination of allocation, its capacity and requested performance of a virtual volume to be generated by the SAN administrator. In the virtual volume management table 33500 copied in the real topology repository 13400, the virtualization system 30000 is already recognized, however, the information of a real volume unused for a virtual volume (hereinafter called an unused real volume) is also registered. Therefore, it is also conceivable that the SAN administrator does not input capacity and performance but inputs one or more unused volumes for generating a virtual volume and directly specifies the unused volumes.

The SAN manager 13100 retrieves the server-real volume mapping management table 13200 and the server-virtual volume mapping management table 13300 using the input value as a key (a step 2620). Concretely, the SAN manager 13100 retrieves the server-real volume mapping management table 13200 and the server-virtual volume mapping management table 13300 using a server of a destination of allocation received from the SAN administrator as a key, and extracts a virtual volume already allocated to the server of the destination of allocation and real volume information corresponding to the virtual volume. If an unused volume forming a virtual volume is not specified in an input value, the SAN manager 13100 retrieves the virtual volume management table 33500 and extracts the information of one or more unused volumes coincident with a condition shown by the input value such as capacity.

The SAN manager 13100 outputs a list of unused volumes for forming a virtual volume to be allocated, a virtual volume already allocated to the server of the destination of allocation and real volume information corresponding to the virtual volume based upon the result of the retrieval (a step 2630). At this time, if an unused volume to be allocated to the server 20000, a virtual volume already allocated to the server 20000 and a real volume corresponding to the virtual volume share resources (for example, if there are real volumes with which the same storage system is provided), a message to the effect is output. Hereby, the SAN administrator can allocate a virtual volume to the server 20000 so that resources are not shared by the normal system and the stand-by system (for example, so that a volume in the same storage system is not used by them). That is, the SAN administrator has only to input a message that the configuration is not to be varied to the SAN management server 10000 if a message that an unused volume to be allocated to the server 20000 and a volume already allocated to the server 20000 share resources is output. The SAN manager 13100 receives the result of the judgment of whether the change of the configuration is to be executed or not by the SAN administrator based upon output information (a step 2640) and change the configuration if permitted (a step 2650). Otherwise, the change of configuration is cancelled (a step 2660). As a result, the processing for checking the change of the configuration of a volume is finished. If an unused volume to be allocated to the server 20000 and a volume already allocated to the server 20000 share resources, the SAN management server 10000 may also control so that the change of the configuration is not executed.

The SAN administrator can also easily generate a virtual volume conscious of a real volume by the processing for checking the change of the configuration of a volume described in the third embodiment in a situation where a virtual volume management function is operated.

Although, in the first, second and third embodiments, a network configuration in which the switch 30000 is provided with a virtualization function is assumed, in a configuration that a device different from the switch 30000 is connected to the network for management 70000 and Fibre Channel 60000 as the virtualization system, the first, second and third embodiments can be also realized by similar processing.

As described above, according to the invention, the SAN administrator can easily grasp correspondence between a real volume and a virtual volume in the storage network.

What is claimed is:

1. A method for outputting information of a network system by a management server, wherein the network system includes
    a first storage system having a first controller and a first real volume managed by the first controller;
    a second storage system having a second controller and a second real volume managed by the second controller;
    a virtualization system coupled to the first storage system and the second storage system, the virtualization system configuring a virtual volume by using the first real volume of the first storage system and the second real volume of the second storage system, and providing the virtual volume as one access target via a port of the virtualization system;
    a computer coupled to the virtualization system and accessing the virtual volume via the port of the virtualization system, and
    the management server,
    the method comprising steps of;
    receiving, by the management server, relation information between the computer and the virtual volume accessed from the computer;
    receiving, by the management server, real volume information from the first storage system and the second storage system, the real volume information including information indicating the first real volume of the first storage system and the second real volume of the second storage system;
    receiving, by the management server, virtual volume information from the virtualization system, the virtual volume information including information indicating a relation among the one virtual volume, the first real volume and the second real volume used for configuring the virtual volume, and the port of the virtualization system via which the virtual volume is accessed from the computer; and
    outputting, by the management server, information indicating a correspondence between a virtual relation and a real relation based on the relation information, the real volume information, and the virtual volume information, wherein the virtual relation is a relation among the virtual volume, the port of the virtualization system, and the computer accessing the virtual volume via the port, and the real relation is a relation among the first real volume and the second real volume used for configuring the virtual volume, the port of the virtualization system, and the computer, so that correspondence between a virtual access path from the computer to the virtual volume and a real access path from the computer to the first real volume of the first storage system and the second real volume of the second storage system is displayed by the management server.

2. A method according to claim 1, wherein the management server receives the relation information from the virtualization system.

3. A method according to claim 1, wherein the management server receives the relation information from computer.

4. A method according to claim 1,
    wherein the virtual volume information further includes information indicating a virtual port provided by the virtualization system for the computer, the at least one virtual port being used to access the virtual volume, and
    wherein the virtual relation further includes a relation among the virtual volume, the virtual port provided by the virtualization system, the port of the virtualization system, and the computer accessing the virtual volume.

5. A method according to claim 1, wherein the outputting step comprising steps of:
    receiving, by the management server, information specifying the virtual relation; and
    outputting information indicating the real relation corresponding to the virtual relation in a manner showing the correspondence between the real relation and the virtual relation.

6. A method according to claim 1, wherein the outputting step comprising steps of:
    receiving, by the management server, information specifying the real relation; and
    outputting information indicating the virtual relation corresponding to the real relation in a manner showing the correspondence between the real relation and the virtual relation.

7. A method according to claim 1, further comprising a step of:
    generating, by the management server, the virtual relation and the real relation based on the relation information, the real volume information, and the virtual volume information.

8. A method according to claim 1, further comprising steps of;
    receiving, by the management server, an error message related to the first real volume;
    specifying, by the management server, the real relation regarding the first real volume;
    specifying, by the management server, the virtual relation corresponding to the real relation; and
    outputting, by the management server, information indicating a correspondence between the virtual relation and the real relation.

9. A computer program product executed in a computer for managing a network system, wherein the network system includes,
    a first storage system having a first controller and a first real volume managed by the first controller;
    a second storage system having a second controller and a second real volume managed by the second controller;
    a virtualization system coupled to the first storage system and the second storage system, the virtualization system configuring a virtual volume by using the first real volume of the first storage system and the second real volume of the second storage system, and providing the virtual volume as one access target via a port of the virtualization system; and a computer coupled to the virtualization system and accessing the virtual volume via the port of the virtualization system, the program product comprising;

a memory medium;

code, recorded in the memory medium, that obtains relation information between the computer and the virtual volume accessed from the computer;

code, recorded in the memory medium, that obtains real volume information from the first storage system and the second storage system, the real volume information indicating the first real volume of the storage system and the second real volume of the second storage system;

code, recorded in the memory medium, that obtains virtual volume information from the virtualization system, the virtual volume information indicating a relation among the virtual volume, the first real volume and the second real volume used for configuring the virtual volume, and the port of the virtualization system via which the virtual volume is accessed from the computer; and code, recorded in the memory medium, that outputs information indicating a correspondence between a virtual relation and a real relation based on the relation information, the real volume information, and the virtual volume information, wherein the virtual relation is a relation among the virtual volume, the port of the virtualization system, and the computer accessing the virtual volume via the port and the real relation is a relation among the first real volume and the second real volume used for configuring the virtual volume, the port of the virtualization system, and the computer, so that correspondence between a virtual access path from the computer to the virtual volume and a real access path from the computer to the first real volume of the first storage system and the second real volume of the second storage system is displayed by the management server.

10. The computer program product according to claim 9, wherein the virtual volume information further includes information indicating a virtual port provided by the virtualization system for the computer, the virtual port being used to access the virtual volume, and wherein the virtual relation further includes a relation among the virtual volume, the virtual port provided by the virtualization system, the port of the virtualization system, and the computer accessing the virtual volume.

11. The computer program product according to claim 9, wherein the code that outputs information further comprises:

code, recorded in the memory medium, that obtains information specifying the virtual relation; and code, recorded in the memory medium, that outputs information indicating the real relation corresponding to the virtual relation in a manner showing the correspondence between the real relation and the virtual relation.

12. The computer program product according to claim 9, wherein the code that outputs information further comprises:

code, recorded in the memory medium, that obtains information specifying the real relation; and code, recorded in the memory medium, that outputs information indicating the virtual relation corresponding to the real relation in a manner showing the correspondence between the real relation and the virtual relation.

13. The computer program product according to claim 9, further comprising:

code, recorded in the memory medium, that generates the virtual relation and the real relation based on the relation information, the real volume information, and the virtual volume information.

14. The computer program product according to claim 9, further comprising:

code, recorded in the memory medium, that obtains an error message related to the first real volume;

code, recorded in the memory medium, that specifies the real relation regarding the first real volume;

code, recorded in the memory medium, that specifies the virtual relation corresponding to the real relation; and code, recorded in the memory medium, that outputs information indicating a correspondence between the virtual relation and the real relation.

* * * * *